(12) United States Patent
Shirakawa et al.

(10) Patent No.: US 7,673,152 B2
(45) Date of Patent: Mar. 2, 2010

(54) MICROPROCESSOR WITH PROGRAM AND DATA PROTECTION FUNCTION UNDER MULTI-TASK ENVIRONMENT

(75) Inventors: Kenji Shirakawa, Kanagawa (JP);
Mikio Hashimoto, Kanagawa (JP);
Keiichi Teramoto, Tokyo (JP); Satoshi Ozaki, Kanagawa (JP); Kensaku Fujimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1078 days.

(21) Appl. No.: 11/335,601

(22) Filed: Jan. 20, 2006

(65) Prior Publication Data

US 2006/0126849 A1    Jun. 15, 2006

Related U.S. Application Data

(63) Continuation of application No. 09/984,407, filed on Oct. 30, 2001, now Pat. No. 7,065,215.

(30) Foreign Application Priority Data

Oct. 31, 2000   (JP) ............................. 2000-333635

(51) Int. Cl.
*G06F 17/30* (2006.01)
(52) U.S. Cl. .................. 713/189; 713/190; 713/193
(58) Field of Classification Search ................ 713/189, 713/190, 193
See application file for complete search history.

(56) References Cited

U.S. PATENT DOCUMENTS

| 4,278,837 | A | 7/1981 | Best |
| 4,465,901 | A | 8/1984 | Best |
| 4,847,902 | A | 7/1989 | Hampson |
| 5,224,166 | A | 6/1993 | Hartman, Jr. |
| 5,825,878 | A | 10/1998 | Takahashi |
| 6,003,117 | A | 12/1999 | Buer et al. |
| 6,311,270 | B1 | 10/2001 | Challener et al. |
| 6,745,166 | B1 | 6/2004 | Sugahara et al. |

FOREIGN PATENT DOCUMENTS

| EP | 0 583 140 | 2/1994 |
| GB | 2 122 777 | 1/1984 |
| JP | 9-258977 | 10/1997 |
| JP | 9-259044 | 10/1997 |
| JP | 11-282756 | 10/1999 |

(Continued)

OTHER PUBLICATIONS

The Linux Information Project, Context Switching Definition, year 2006.*

(Continued)

*Primary Examiner*—David Y Jung
(74) *Attorney, Agent, or Firm*—Oblon, Spivak, McClelland, Maier & Neustadt, L.L.P.

(57) ABSTRACT

In a microprocessor, a program key for decrypting a program and a data key for encrypting/decrypting data processed by the program are handled as cryptographically inseparable pair inside the microprocessor, so that it becomes possible for the microprocessor to protect processes that actually execute the program, without an intervention of the operating system, and it becomes possible to conceal secret information of the program not only from the other user program but also from the operating system.

14 Claims, 13 Drawing Sheets

FOREIGN PATENT DOCUMENTS

| JP | 2001-318787 | 11/2001 |
|---|---|---|
| JP | 2002-529815 | 9/2002 |
| WO | WO 00/26791 | 5/2000 |

OTHER PUBLICATIONS

Toshiba, MIPS based RISC Microprocessors, printed year 2009.*

Mlyamori et al, A Qualitative Analysis of Reconfiigurable Coprocessors for Multimedia Applications, printed year 2009.*

Microsoft MSDN, Understanding Context Switching, printed year 2009.*

Fast asymmetric cryptosystem based on Boolean product of matrices; Alaverdyan, Y.; Margarov, G.; Computer Systems and Applications, 2009. AICCSA 2009. IEEE/ACS International Conference on May 10-13, 2009 pp. 392-395.*

A Fault Attack on Pairing-Based Cryptography; p. D.; Vercauteren, F.; Computers, IEEE Transactions on vol. 55, Issue 9, Sep. 2006 pp. 1075-1080.*

A conference key distribution system; Ingemarsson, I.; Tang, D.; Wong, C.; Information Theory, IEEE Transactions on vol. 28, Issue 5, Sep. 1982 pp. 714-720.*

D. Aucsmith, et al., Proceedings 1996 Intel Software Developer's Conference, pp. 317-333, "Tamper Resistant Software: An Implementation", 1996.

D. J. Albert, et al., IEEE Computer Society, vol. 17, No. 4, XP-001108824, pp. 68-73, "Combatting Software Piracy by Encryption and Key Management", Apr. 1984.

"UWXAFS BinaryFormat Data Files", 1999, [Retrieved from Internet Mar. 21, 2005], http://depts.washington.edu/uwxafs/Docs/fileh/fileh-3.html.

Design and Implementation of a Private and Public Key Crypto Processor and its Application to a Security System; Ho Won Kim; Sunggu Lee; Consumer Electronics, IEEE Transactions on vol. 50, Issue 1, Feb. 2004 pp. 214-224.

High-Speed Implementation of an ECC-Based Wireless Authentication Protocol on an ARM Microprocessor; Aydos, M.; Yanik, T.; Koc, C.K.; Communications, IEEE Proceedings—vol. 148, Issue 5, Oct. 2001 pp. 273-279.

A High-Speed ECC-Based Wireless Authentication on an ARM Microprocessor Aydos, M; Yanik, T.; Koc, C. K.; Computer Security Applications, 2000. ACSAC '00. 16$^{th}$ Annual Conference Dec. 11-15, 2000 pp. 401-409.

* cited by examiner

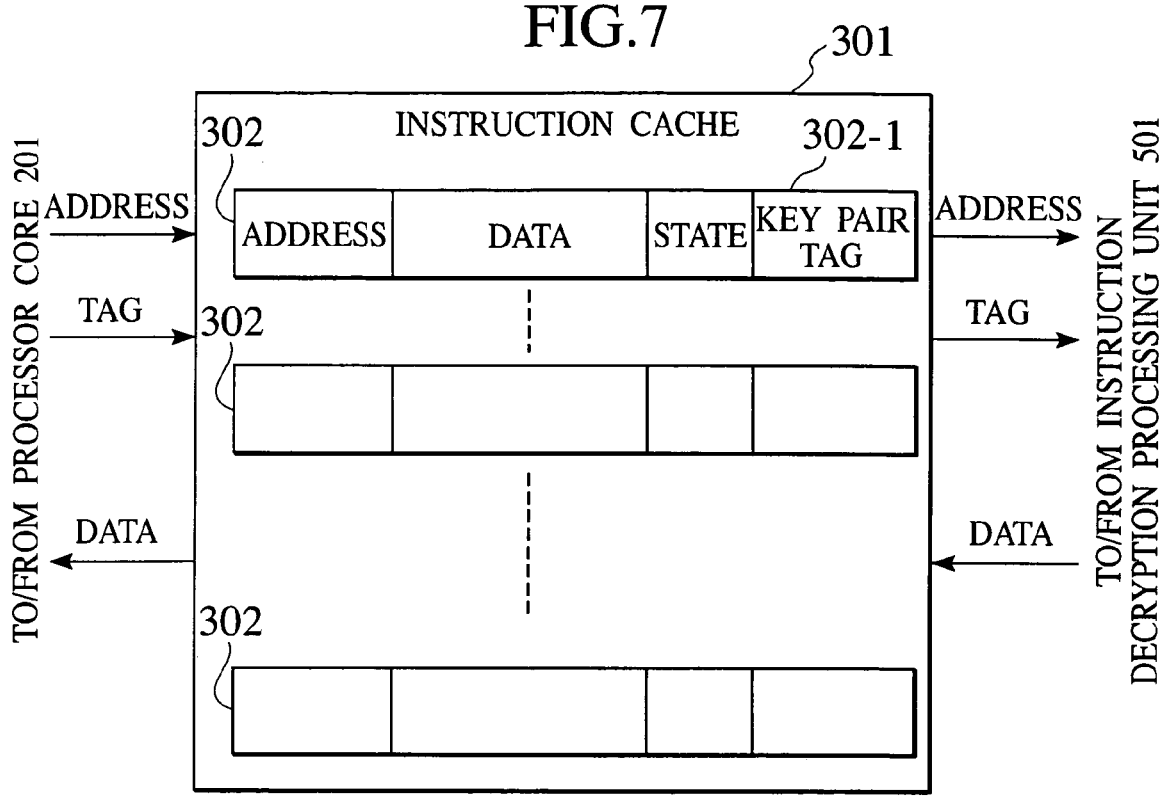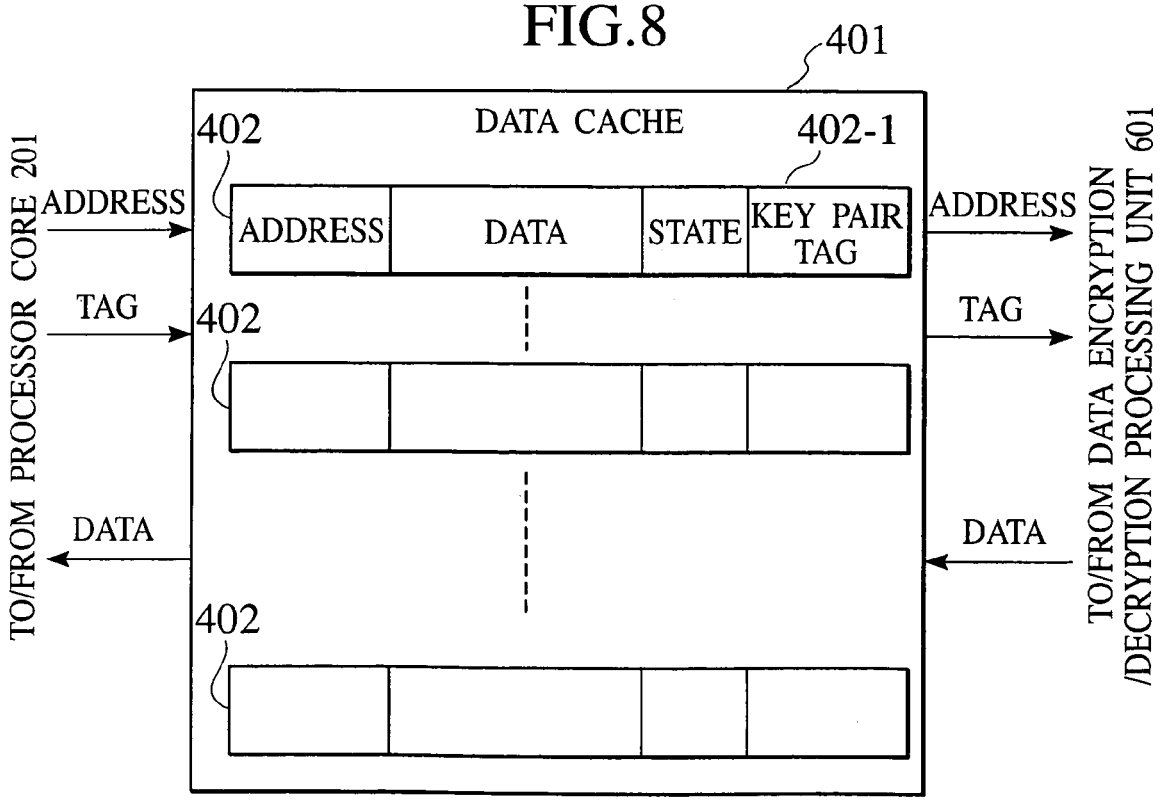

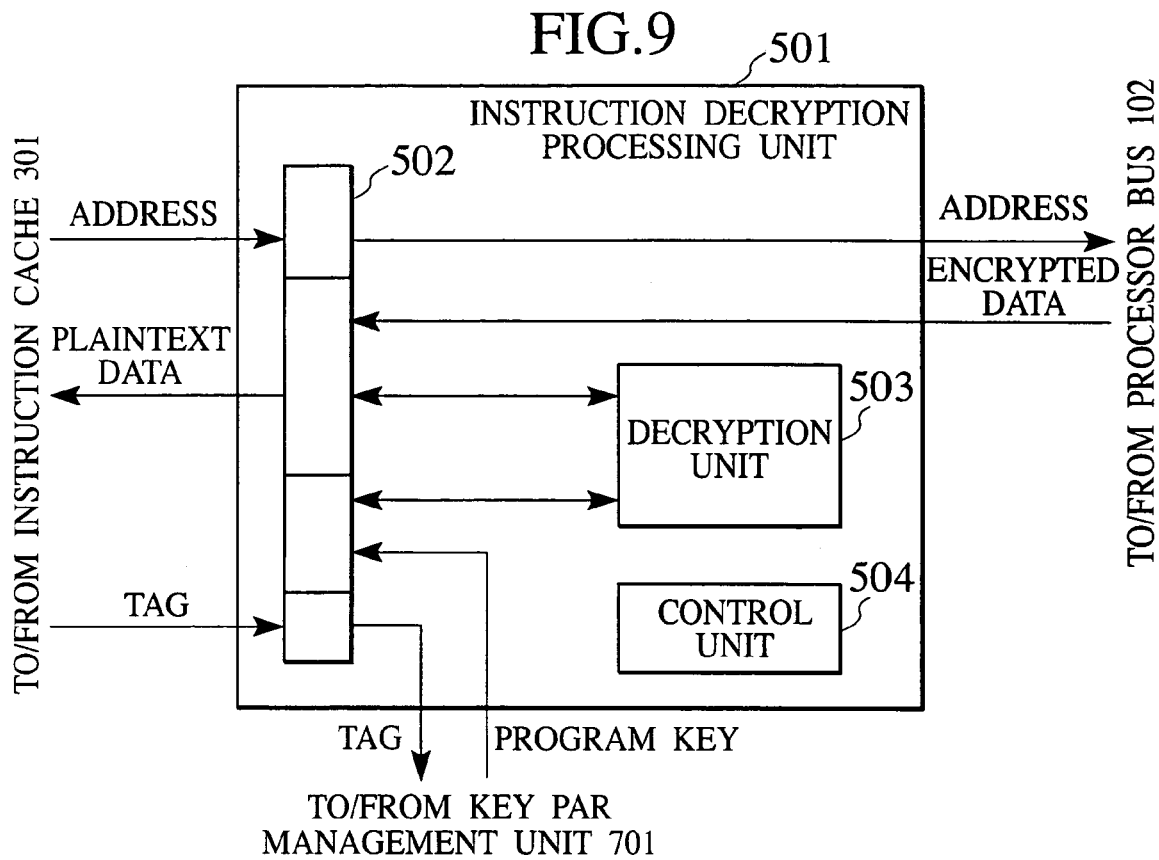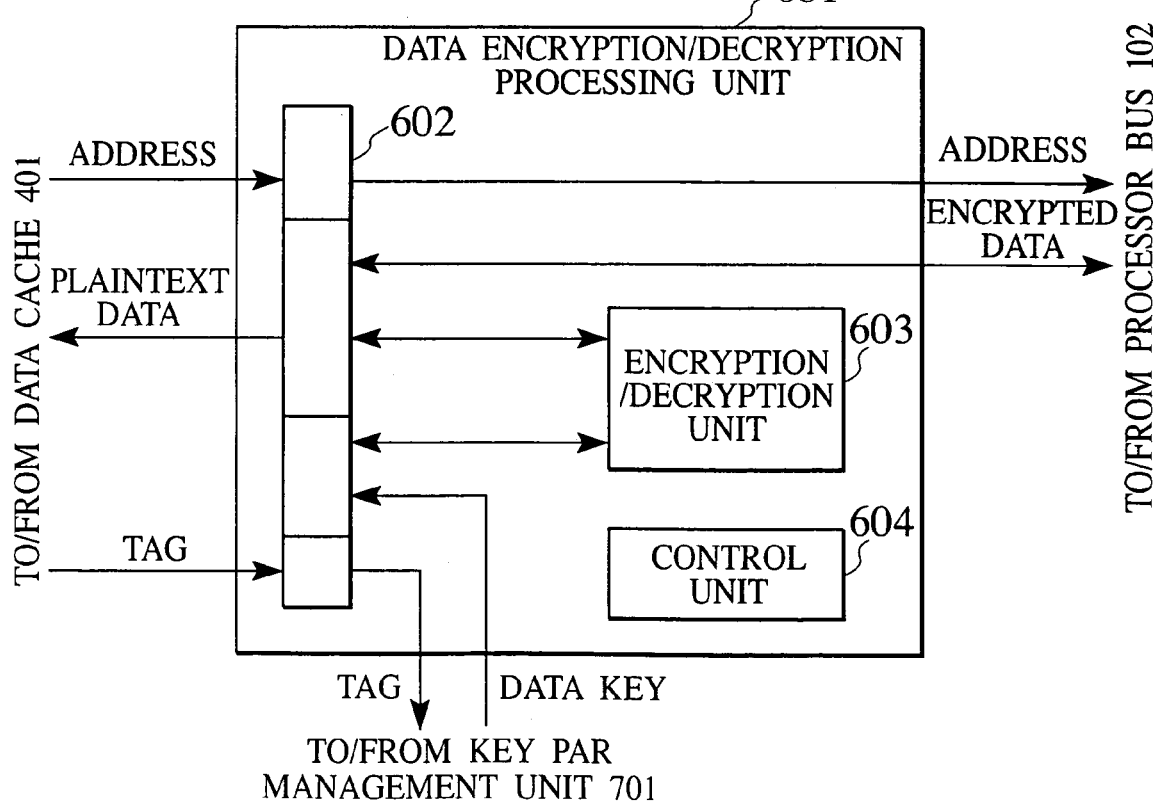

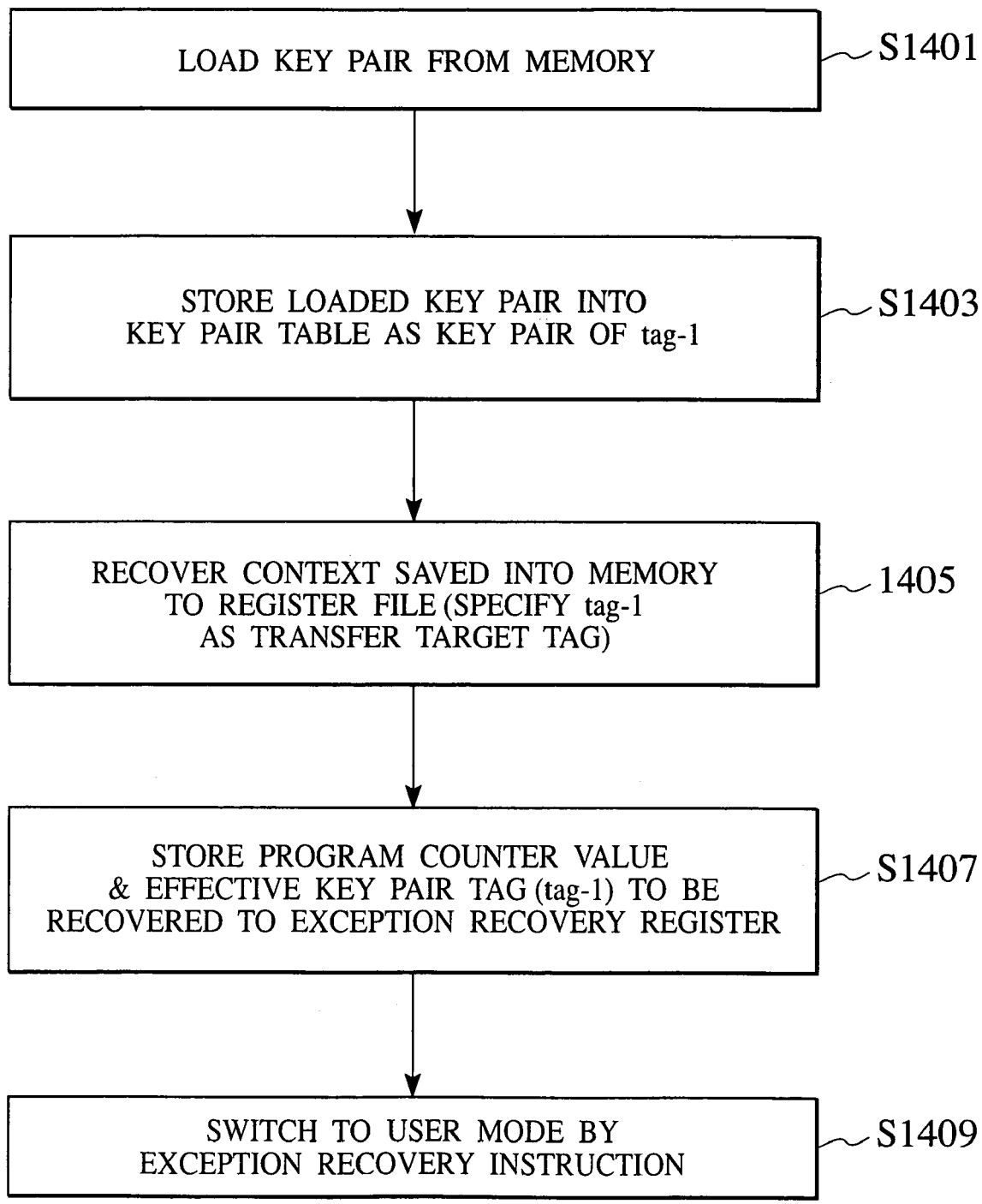

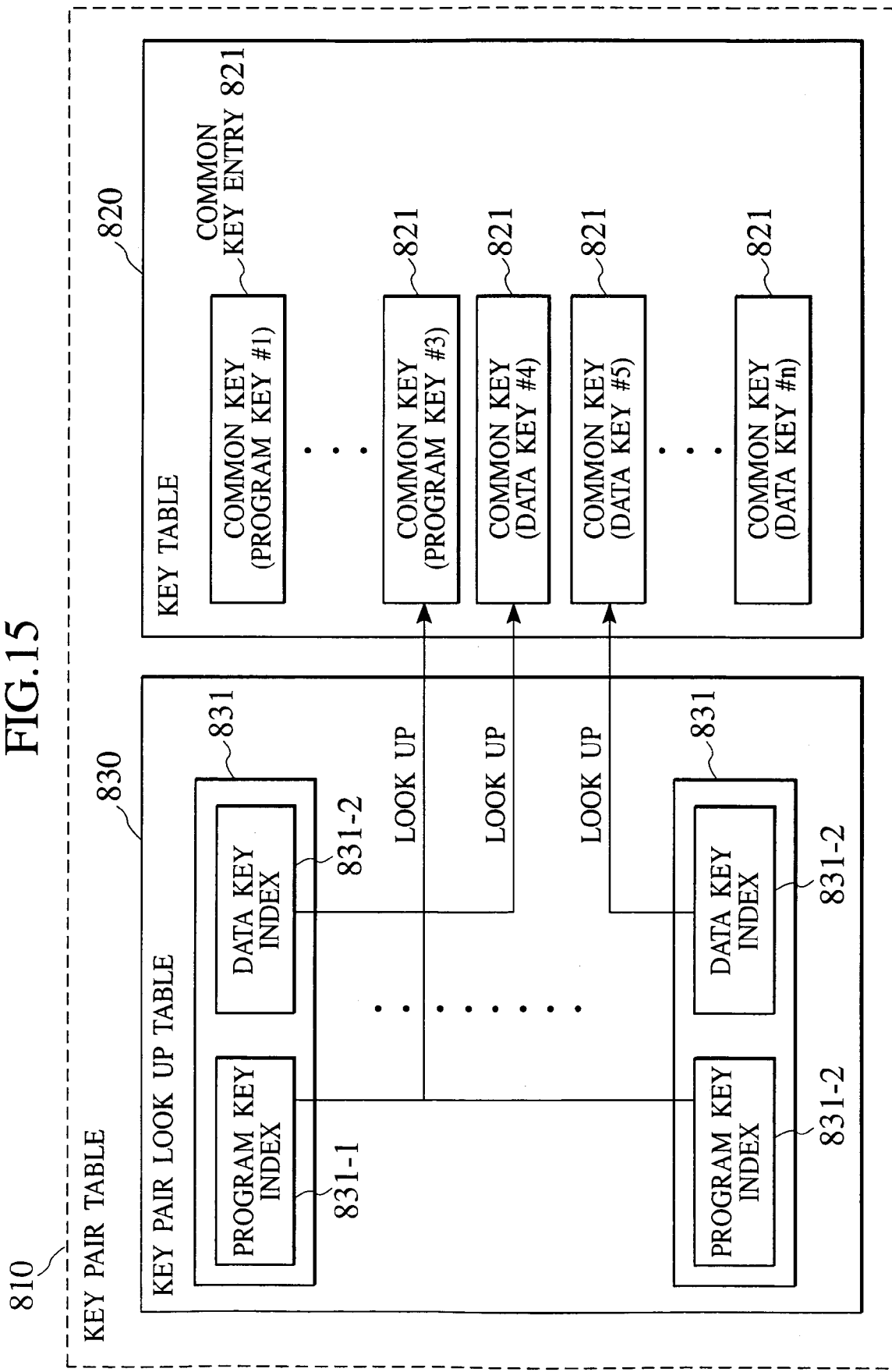

MICROPROCESSOR WITH PROGRAM AND DATA PROTECTION FUNCTION UNDER MULTI-TASK ENVIRONMENT

CROSS-REFERENCE TO RELATED APPLICATIONS

The present application is a continuation of U.S. application Ser. No. 09/984,407 filed on Oct. 30, 2001, and in turn claims priority to JP 2000-333635 filed on Oct. 31, 2000, the entire contents of each of which are hereby incorporated herein by reference.

BACKGROUND OF THE INVENTION

1. Field of the Invention

The present invention relates to a microprocessor for supporting a multi-task program execution environment and a data protection method for this microprocessor.

2. Description of the Related Art

There are demands for a microprocessor that has a protection function at a time of executing a program in a computer system. In the currently available processors, a protection function in the virtual memory management and a mechanism for access limitation with respect to peripheral input/output devices are considered indispensable in order to secure the safety of the computer system that provides the multi-task execution environment.

Moreover, in recent years, a group of programs that themselves should be protected are becoming an important protection target in view of the protection mechanism. For example, a program that is protected by the copyright is not permitted to be executed in a style that violates the copyright. There is also a program that handles data to be concealed from the third party. If the program that handles data to be concealed and its execution state have a possibility of being analyzed, the secrecy of data cannot be guaranteed, so that the strict protection will be required.

In order to execute these programs safely, there are systems for guaranteeing the safety cryptographically that have been proposed and realized in practice. One of them is the tamper resistant software (David Aucsmith et al.; "Tamper Resistant Software: An implimentation", Proceedings of the 1996 Intel Software Developer's Conference). This is a technique in which a part or a whole of the program is encrypted and then distributed and stored, and the program and data are decrypted and executed immediately before utilizing the program, and the program is re-encrypted after finishing the program if necessary.

However, the tamper resistant software technique only makes the analysis by the analyzing tools such as a reverse assembler and a debugger more complicated basically. As long as the program is executable by the processor, it is always possible to analyze the program execution process by the sequential analysis that follows the program execution from a start of the program. In other words, although it is safe in a process of distributing the program, it has been impossible to conceal the program and data from the third party who has means for accessing the computer system that executes the program once the program is executed.

There are also techniques for concealing the decrypted program from an external of the microprocessor by providing a built-in encryption/decryption processing function in the microporcessor, rather than carrying out the encryption/decryption by software, as disclosed in U.S. Pat. No. 4,847,902 (Hampson), U.S. Pat. No. 5,224,166 (hartman), U.S. Pat. No. 5,825,878 (Takahashi), and Japanese Patent Application Laid Open No. 11-282756 (1999).

What is characteristic to the scheme for providing the built-in encryption/decryption processing function in the microprocessor is that the microprocessor can maintain the secret data in a form that is physically concealed from an external. Namely, the secret data are maintained in such a form that the secret cannot be revealed even by the destructive inspection of the microprocessor. This can be utilized as follows. The secret key of the public key cryptosystem is provided as a built-in secret data in the microprocessor in advance. The program is encrypted by some encryption key (for which the secret key cryptosystem is used in general) by the program vendor, for example, and distributed to the microprocessor. At this point, the encryption key is further encrypted by the public key corresponding to the secret key of the microprocessor and attached to the program.

By this mechanism, it is possible to provide the program itself in a safe form, such that its execution process cannot be recovered by the analytic method such as the reverse assembling. Also, it is cryptographically difficult to alter the program into an intended form without knowing the encryption key of the program.

However, these microprocessors for executing encrypted programs have been associated with a serious problem. Namely, these microprocessors are usually used under the operating system (OS) for realizing the multi-task environment. In the multi-task environment, a plurality of programs are executed virtually simultaneously by the time division of the microprocessor using the operation called context switching. In the process of this context switching, the OS can read and write all the execution states of the microprocessor. Consequently, by analyzing the behavior of the OS or by altering the OS itself, it becomes possible to analyze all the execution states of the program even if it is supposed to be protected by the encryption.

The prior art provides a partial resolution of this problem. For example, Japanese Patent Application Laid Open No. 11-282756 (1999) discloses a technique for providing a secret memory in a processor in order to maintain the secret data of the application. In this example, a predetermined reference value is necessary in order to access data in the secret memory. However, there is no teaching regarding how to protect the reference value for obtaining the access right with respect to the secret data, especially from the operating system, when a plurality of programs are running on the same processor.

Also, Japanese Patent Application No. 2000-135010 discloses a technique for carrying out the context switching by hardware such that the contents of the register files at a time of the context switching are encrypted and temporarily saved in a memory, so as to conceal the execution states of the program from the operating system. In this way, it becomes cryptographically difficult to recover the secret data by analyzing the execution states of the processor that are saved in the memory, so that it becomes possible to guarantee the safety of the encrypted program. However, this technique is associated with the following problems.

The first problem is that the target of protection by the encryption is limited only to the register files. There can be cases where the microporcessor internally has many memories or a large capacity memory besides the register files, and it such cases it is expected that the processing load due to the context switching becomes heavier in proportion to the capacity. However, Japanese Patent Application No. 2000-135010 discloses absolutely no teaching regarding how to protect these internal memories and how to reduce the processing load due to the context switching.

For example, in the case where the microprocessor has a large capacity internal memory, the memory cannot be protected entirely by the prior art so that the leakage of the protected data is unavoidable. Also, if an attempt to protect it entirely is made, the performance degradation due to the encryption processing would be caused because of the large capacity, so that it would give rise to a severe limitation in practice.

As a known method for reducing the processing load due to the context switching in a processor having a large capacity cache memory, there is a method for including an identifier for identifying a process that owns the cached data into a tag to be used in judging hit/miss at an associative memory unit of the cache (this method will be referred to as a process tag scheme hereafter).

However, it is difficult to apply this method straightforwardly, because the process is a concept used by the operating system in order to treat the processor virtually and it is difficult for the processor itself to handle the identifier for identifying the process. Also, even if the processor is provided with a mechanism for protecting access to data by using an identifier for identifying the process, as long as the process identifier is under the management of the operating system, nothing can be done against the leakage of the secret by the alteration of the operating system.

The second problem is that the context switching is fixedly done by hardware and all registers are to be saved or recovered so that there is a lack of flexibility. For example, in the case of the frequently occurring exception processing, it is preferable to realize the optimization to save or recover only a part of the register files but a technique disclosed in Japanese Patent Application No. 2000-135010 saves or recovers all the contents of the register files collectively.

BRIEF SUMMARY OF THE INVENTION

It is therefore an object of the present invention to provide a miroporcessor which is capable of guaranteeing both the secrecy of the program itself and the secrecy of data handled by the program cryptographically, and reducing the processing load due to the context switching under the multi-task environment.

It is another object of the present invention to provide a microprocessor which is capable of realizing the optimization of protection target processing in order to enable saving or recovery of only a necessary part of data under the multi-task environment.

According to one aspect of the present invention there is provided a microprocessor, comprising: an instruction decryption processing unit configured to decrypt a program in an encrypted form by using a first encryption key; a data encryption/decryption processing unit configured to encrypt/decrypt data processed by the program in a decrypted form by using a second encryption key; a key pair management unit connected to the instruction decryption processing unit and the data encryption/decryption processing unit, having a first memory region for storing the first encryption key and the second encryption key in correspondence as a key pair; and a second memory region for storing an identifier for identifying the key pair, along with related data of the program.

According to another aspect of the present invention there is provided a data protection method for a microprocessor, the data protection method comprising: decrypting a program in an encrypted form by using a first encryption key; generating a second encryption key corresponding to the first encryption key, for encrypting/decrypting data processed by the program in a decrypted form; storing the first encryption key and the second encryption key in correspondence as a key pair; giving an identifier for identifying the key pair, to the key pair; and reading out the second encryption key according to the identifier, encrypting the data by using the second encryption key and saving the data in an encrypted form to an external memory when an exception occurs during an execution of the program.

Other features and advantages of the present invention will become apparent from the following description taken in conjunction with the accompanying drawings.

BRIEF DESCRIPTION OF THE DRAWINGS

FIG. 7 is a block diagram showing an exemplary detailed configuration of an instruction cache in the microprocessor of FIG. 1.

FIG. 8 is a block diagram showing an exemplary detailed configuration of a data cache in the microprocessor of FIG. 1.

FIG. 9 is a block diagram showing an exemplary detailed configuration of an instruction decryption processing unit in the microprocessor of FIG. 1.

FIG. 10 is a block diagram showing an exemplary detailed configuration of a data encryption/decryption processing unit in the microprocessor of FIG. 1.

FIG. 14 is a flow chart showing details of a context recovery step in the processing shown in FIG. 12.

FIG. 15 is a block diagram showing an exemplary detailed configuration of a key pair table in a microprocessor according to the second embodiment of the present invention.

DETAILED DESCRIPTION OF THE INVENTION

Referring now to FIG. 1 to FIG. 14, the first embodiment of a microprocessor according to the present invention will be described in detail. In the present invention, it is presupposed that the microprocessor executes the encrypted program under the multi-task environment.

Figure 1:
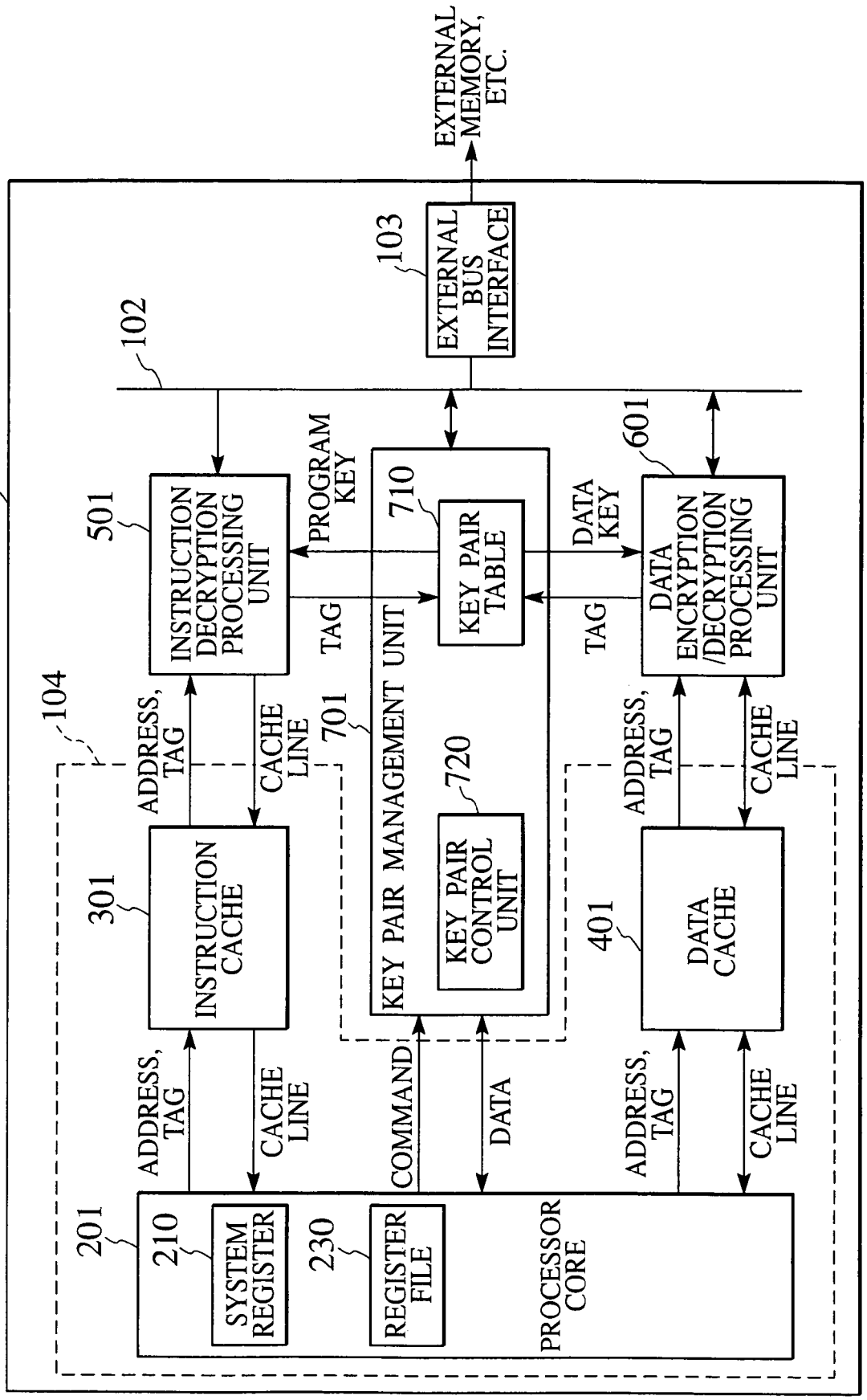
FIG. 1 is a block diagram showing an exemplary configuration of a microprocessor according to the first embodiment of the present invention.

FIG. 1 shows a functional configuration of the microprocessor 101 according to the first embodiment. The microprocessor 101 has a processor core 201 for executing the program, an instruction cache 301 for temporarily storing instruction sequences of the program, a data cache 401 for temporarily storing data processing by the program, an instruction decryption processing unit 501 for decrypting the encrypted program at a time of execution and supplying the decrypted program to the processor core 201, a data encryption/decryption processing unit 601 for encrypting or decrypting data executed by the decrypted program, and a key pair management unit 701.

For the decryption of the encrypted program at the instruction decryption processing unit 501, a program key given by the public key cryptosystem is used. Also, for the encryption/decryption of the data processed by the program, a data key generated in correspondence to the program key is used. One feature of the first embodiment is that the key pair management unit 701 has a key pair table for storing these program key and data key in one-to-one correspondence as a pair, as will be described in detail below.

Also, the processor core 201 includes a system register 210 and a register file 230. The system register 210 indicates a tag (identifier) for identifying the key pair for the currently executed program. The register file 230 stores the program data or the processed data along with a tag of the corresponding key pair. These functions will be described in further detail below.

The microprocessor 101 also has a processor bus 102 and an external bus interface 103, through which the microprocessor 101 is connected to a memory or peripheral devices provided outside of the microprocessor 101.

The processor core 201, the instruction cache 301 and the data cache 401 are located within a protected region 104 indicated by a dashed line in FIG. 1. The protected region 104 is a region protected from the external or the OS, and data are handled in plaintext forms within this region. On the other hand, outside the protected region 104, data to be concealed are always encrypted. When the encrypted data is read from outside of the protected region 104 into inside of the protected region 104, it is decrypted by the instruction decryption processing unit 501 when it is to be read as instruction, or it is decrypted by the data encryption/decryption processing unit 601 when it is to be read as data. The program key and the data key to be used for the decryption are supplied from the key pair management unit 701.

As mentioned above, one feature of the first embodiment is that the decrypted data in plaintext form is attached with a tag for identifying the key pair used in the decryption processing as an attribute indicating that the cryptographic operation was applied, and stored in the register file 230 inside the processor core 201.

Figure 2:
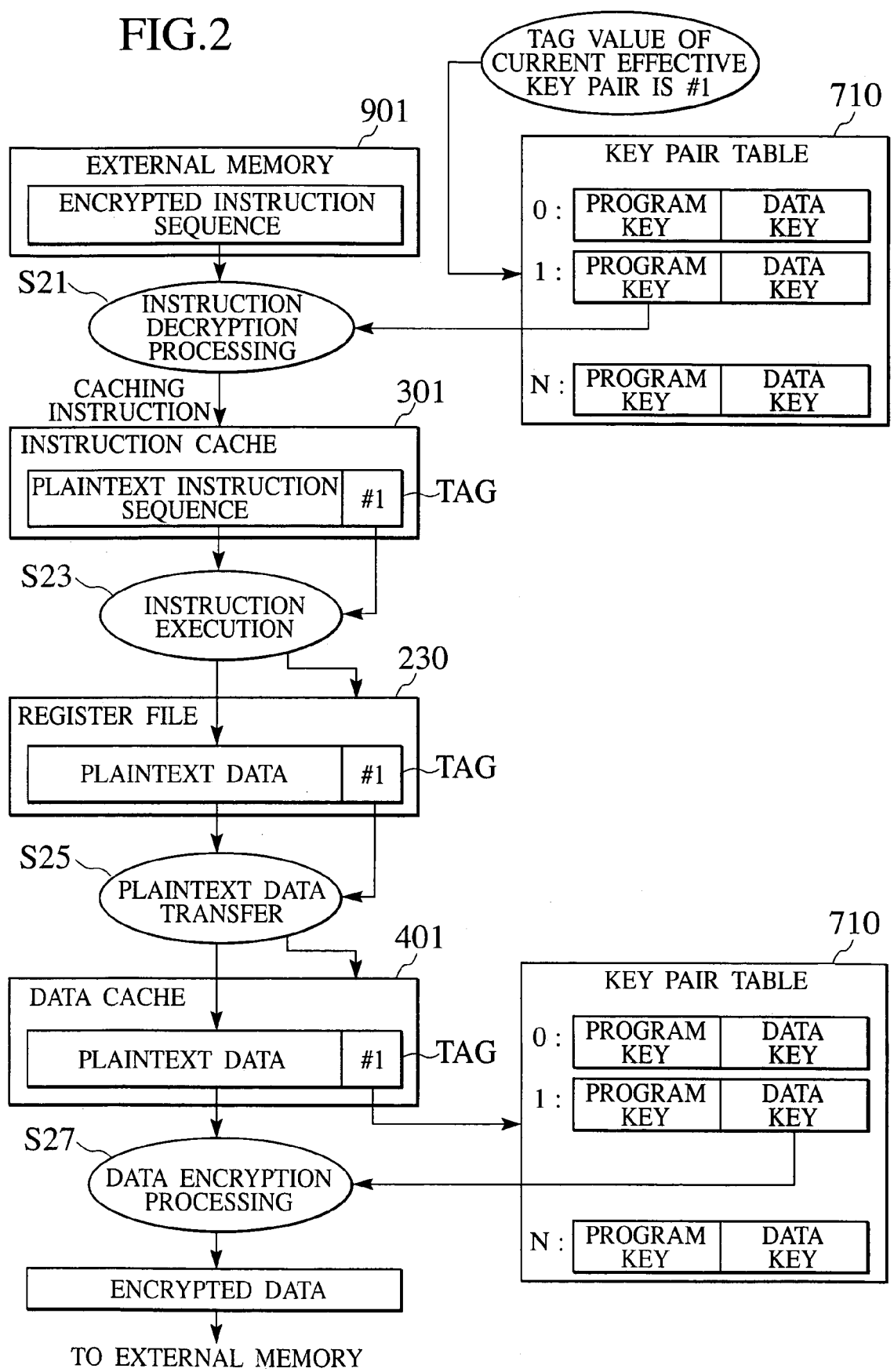
FIG. 2 is a diagram showing a flow of processing for encrypting and saving data to be carried out by the microprocessor of FIG. 1.
Figure 3:
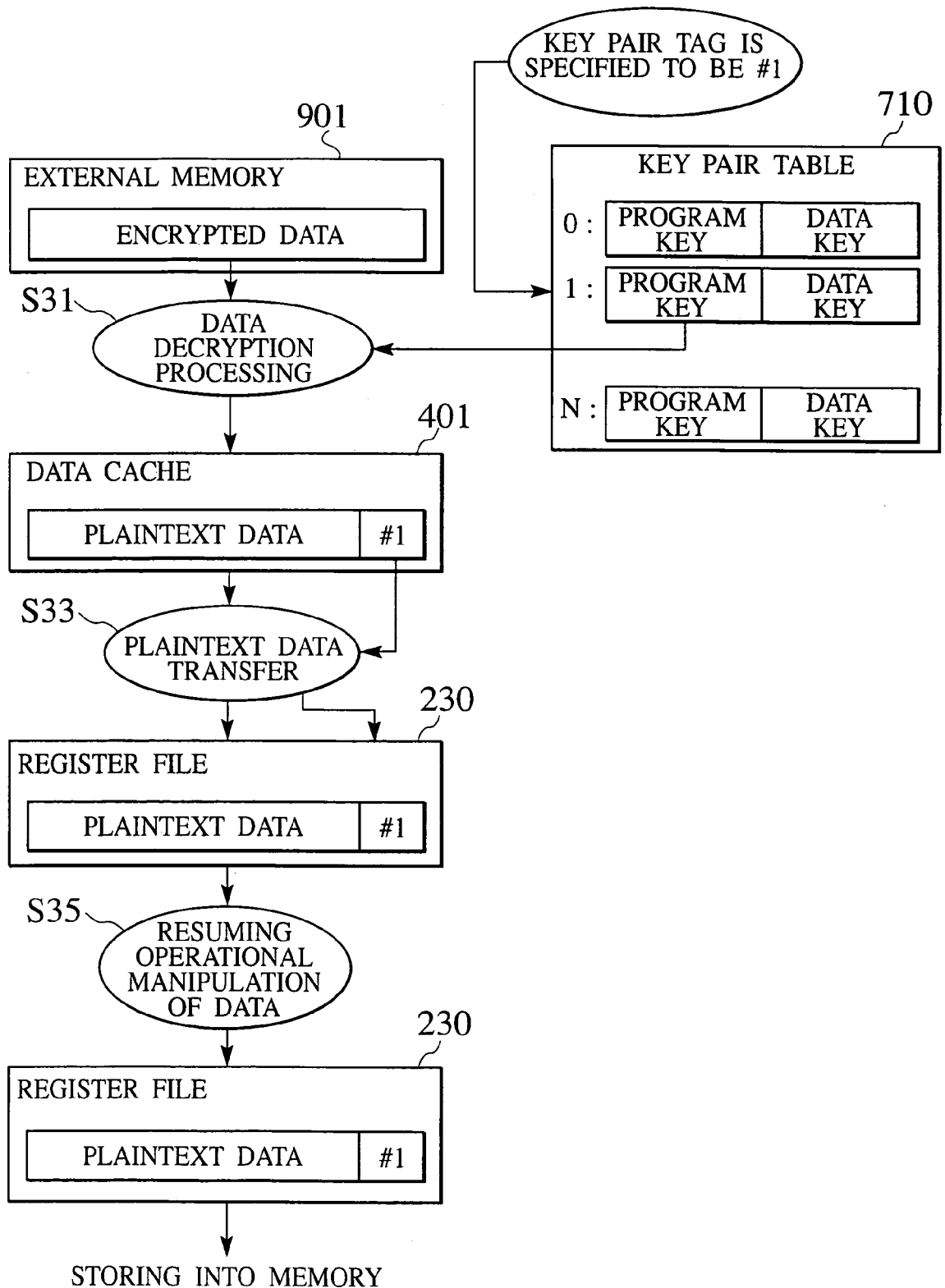
FIG. 3 is a diagram showing a flow of processing for recovering saved data to be carried out by the microprocessor of FIG. 1.

FIG. 2 and FIG. 3 show an outline of the processing by the microprocessor 101.

First, as shown in FIG. 2, at the step S21, the instruction sequence of the encrypted program stored in the external memory 901 outside the microprocessor 101 is decrypted by using the program key of the key pair (which will be referred to as an effective key pair hereafter) that is effective for the currently executed program. The current effective key pair is a key pair whose tag is indicated by the system register 210 so that it can be ascertained according to this tag. In the example of FIG. 2, the tag value of the effective key pair is #1. According to this tag value, the program key corresponding to the tag #1 is read out from the key pair table 710 of the key pair management unit 701.

Next, at the step S23, the program is executed according to the decrypted instruction sequence which is now in the plaintext form. The data obtained as a result of the execution of the program, i.e., the operational manipulation, are attached with a key pair tag and stored into the register file 230.

Next, at the step S25, the data in the register file 230 are transferred to the data cache 401.

Finally, at the step S27, the data key is read out from the key pair table 710 according to the key pair tag attached to the data, the data are encrypted by using the data key, and the encrypted data are transferred (saved) to the external memory.

FIG. 3 shows the recovery processing for the saved data.

First, the key pair tag to be used for the recovery is specified. Then, at the step S31, the encrypted data are read from the external memory 901 into the microprocessor 101, the data key specified by the key pair tag is read out from the key pair table 710, the encrypted data are decrypted by using the data key, and the decrypted data are cached into the data cache 401 within the protected region 104.

Next, at the step S33, the plaintext data on the data cache 401 are transferred to the register file 230. Then, at the step S35, the operational manipulation with respect to the data on the register file 230 is resumed.

FIG. 4 to FIG. 11 show detailed configurations of constituent elements of the microprocessor 101 that carries out the operation as described above. With references to FIG. 4 to FIG. 11, the configuration of each constituent element and the protection function based on the key pair tag will now be described in detail.

Figure 4:
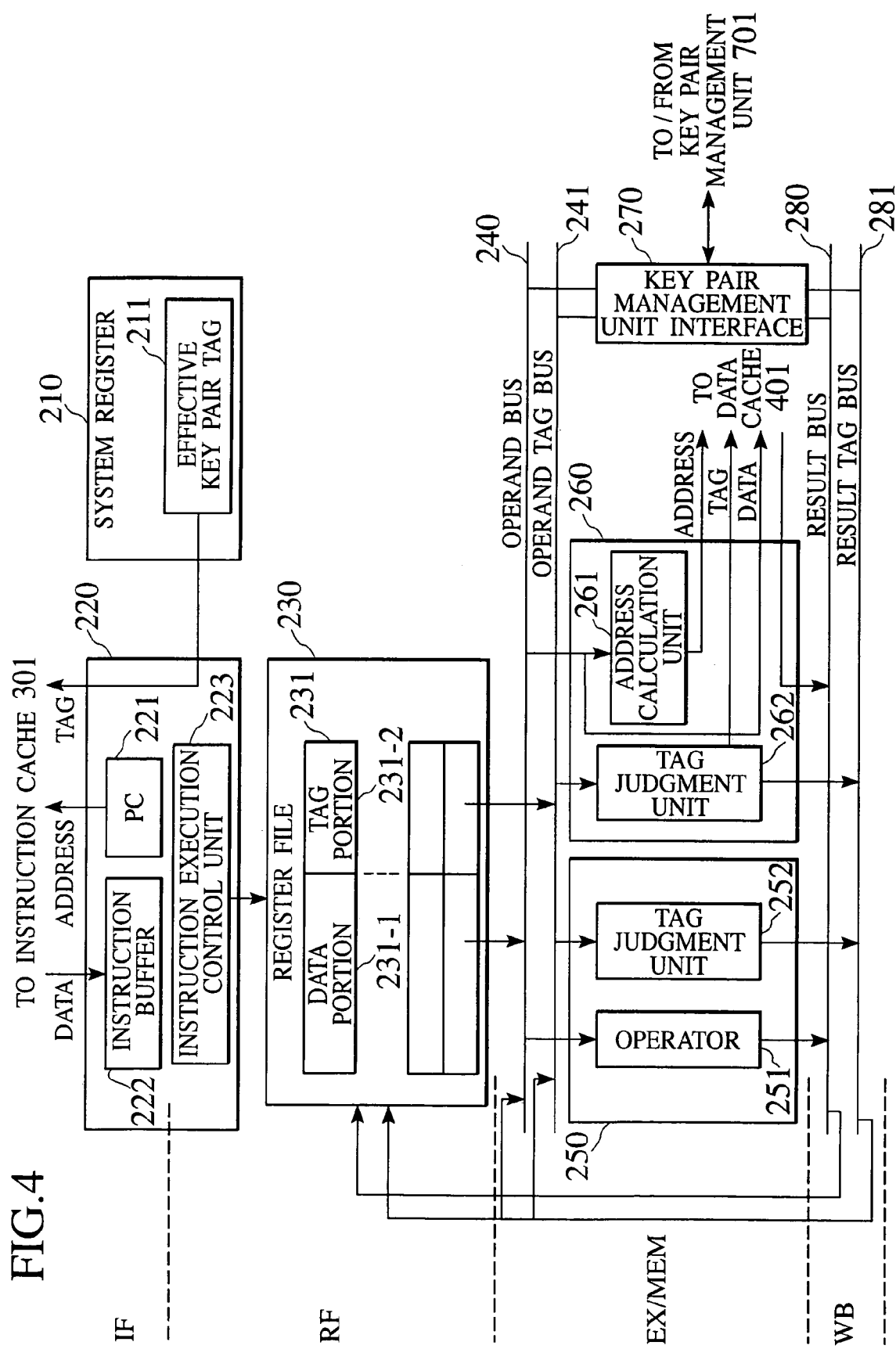
FIG. 4 is a block diagram showing an exemplary detailed configuration of a processor core in the microprocessor of FIG. 1.

FIG. 4 shows an exemplary detailed configuration of the processor core 201. In the following, an exemplary case of adding modifications according to the present invention to an architecture of the RISC type microprocessor manufactured by the MIPS Technologies, Inc. will be described. More specifically, in the following example, the processor pipeline structure is based on the R3000 type of the MIPS Technologies, Inc., and the instruction set is based on the MIPS-I or MIPS-IV instruction set of the MIPS Technologies, Inc., but the applicability of the present invention is not limited to the processor of the MIPS Technologies, Inc.

Note that the five pipeline stages IF (instruction fetch), RF (register read), EX (execution), MEM (memory access) and WB (write back) of the processor core 201 of FIG. 4 are indicated at a leftmost section of FIG. 4.

The processor core 201 contains the system register 210, an instruction fetch decoder 200, the register file 230, an operation unit 250, and a memory access unit 260.

The system register 210 is based on the system register corresponding to CP0 of MIPS R3000, to which the virtual address management function and the exception processing function are added, and an effective key pair tag register 211 for storing a tag of the effective key pair which specifies the currently executed process is provided. Namely, the effective key pair tag register 211 stores a tag indicating the key pair to be used for the encryption processing of the currently executed effective program and the data processed by this program.

The instruction fetch decoder 220 contains a program counter (PC) 221, an instruction buffer 222, and an instruction execution control unit 223, Under the control of the instruction execution control unit 223, the instruction is fetched to the instruction buffer 222 from an address indicated by the program counter 221, and the signal (now shown) for controlling each data path is generated by decoding the fetched instruction.

In the first embodiment, not just an instruction address but also a value of the effective key pair tag register 211 that indicates the currently executed process are sent as parameters of a read request with respect to the instruction cache 301.

Each register 231 in the register file 230 has a register data portion 231-1 as well as a register tag portion 231-2 that is characteristic to the present invention. The register tag portion 231-2 stores the key pair tag that indicates the protection attribute based on the encryption of data stored in that register.

At the RF (register read) phase of the instruction execution pipeline, the content of the register data portion 231-1 is put on an operand bus 240, and the content of the register tag portion 231-2 is put on an operand tag bus 241.

An arithmetic logical operation unit 250 corresponds to the EX phase of the instruction execution pipeline. In the first embodiment, the arithmetic logical operation unit 250 has a tag judgement unit 252 for judging the operand of the operation in addition to an ordinary operator (operation data path) 251.

Figure 5:
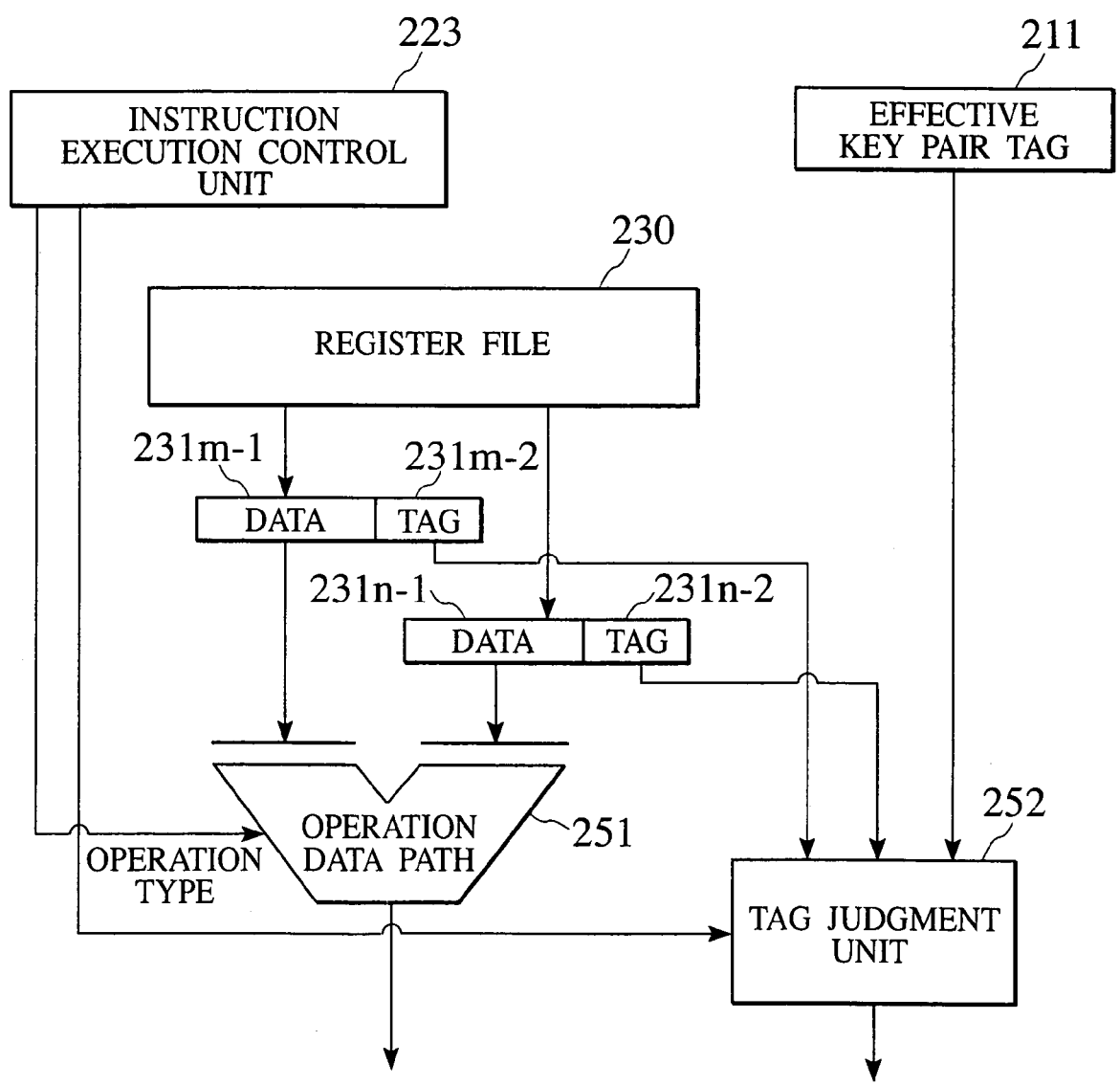
FIG. 5 is a block diagram showing an exemplary detailed configuration of an arithmetic logical operation unit in the processor core of FIG. 4.

As shown in FIG. 5, the tag judgement unit 252 has a function for determining whether the execution of the operation is permitted or not according to at least three values including a type of the operation, a value of the tag attached to the operand of the operation, and the effective key pair tag. The type of operation is entered from the instruction execution control unit 223 into the tag judgement unit 252, and the tag value is entered from the tag portion 231-2 of the register file 230. The current effective key pair tag is entered from the effective key pair tag register 211 of the system register 210. When the execution is judged as not permitted by the tag judgement unit 252, the processor core 201 will cause an exception that cannot be resumed, and that instruction will be aborted. When the execution is judged as permitted by the tag judgement unit 252 and if the execution result for that instruction exists, data of that execution result will be put on a result bus 280 and a key pair tag of that execution result will be put on a result tag bus 281.

The memory access unit 260 corresponds to the EX/MEM phase of the instruction execution pipeline. In the first embodiment, the memory access unit 260 has a data transfer tag judgement unit 262 in addition to an ordinary address calculation unit 261.

The memory access unit 260 outputs not just a data address obtained by the address calculation unit 261 but also either the tag value attached to the operand or the effective key pair tag value as parameters of a read/write request with respect to the data cache 401. A tag judgement unit 262 has a function for determining whether the execution of the transfer is permitted or not according to at least four values including a data transfer source, a data transfer destination, a value of the tag attached to the data to be transferred, and the effective key pair tag. When the execution is judged as not permitted by the tag judgement unit 262, the processor core 201 will cause an exception that cannot be resumed, and that instruction will be aborted. When the execution is judged as permitted by the tag judgement unit 262 and if the execution result for that instruction exists, data of that execution result will be put on the result bus 280 and a key pair tag of that execution result will be put on the result tag bus 281.

A key pair management unit interface 270 for controlling a key pair management unit 701 to be described below is unique to the present invention.

At the WB stage of the instruction execution pipeline, the data on the result bus 280 and the key pair tag on the result tag bus 281 are written back to the register file 230 if necessary.

Figure 6:
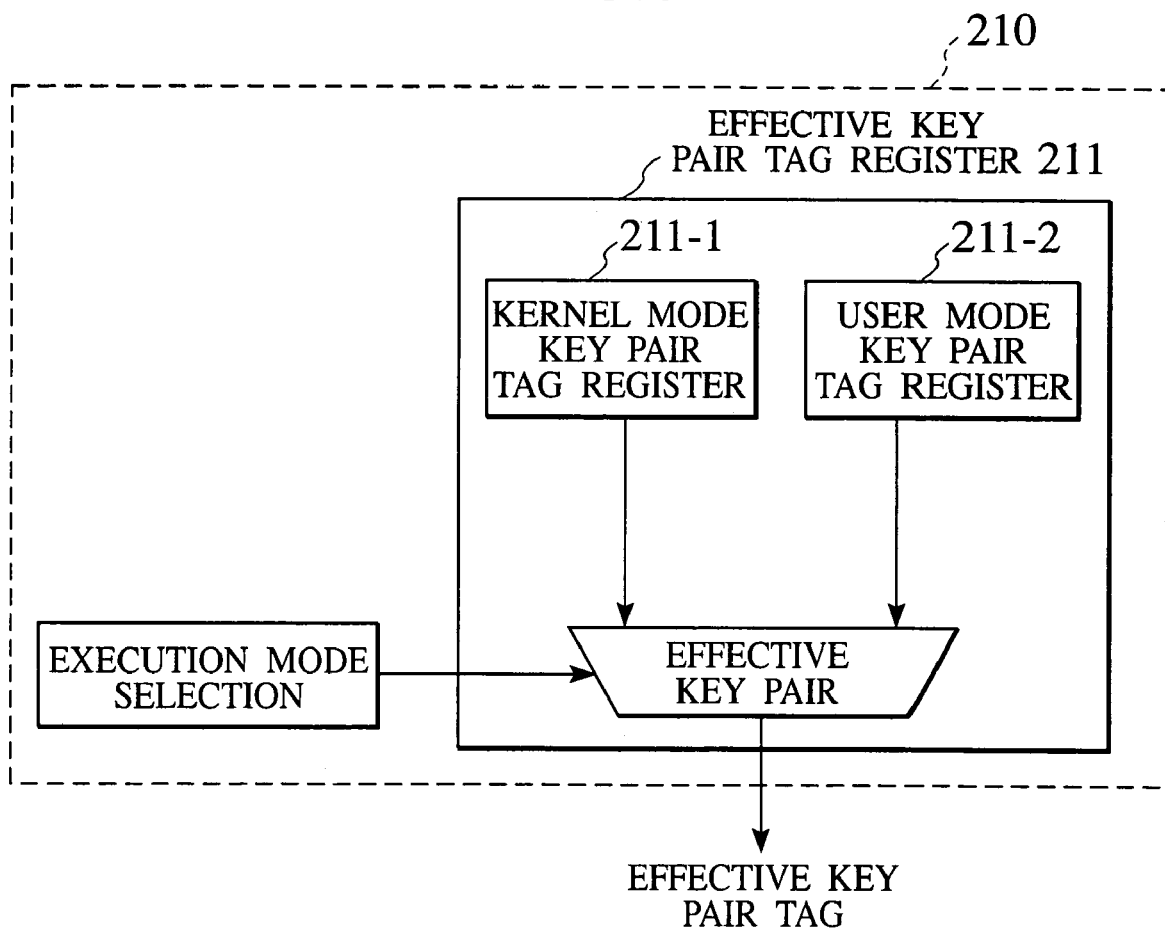
FIG. 6 is a block diagram showing an exemplary detailed configuration of a system register in the processor core of FIG. 4.

FIG. 6 shows a configuration of the system register 210 for indicating the current effective key pair tag. The effective key pair tag register 211 indicates a tag of the effective key pair of the currently executed program.

In the first embodiment, two tag values among the key pair tag values are reserved for the special purposes. One is a tag value for indicating that the encryption processing should not be carried out (a tag with this tag value will be referred to as a zero tag). At the instruction decryption processing unit 501 and the data encryption/decryption processing unit 601, data (or instruction) are transferred without carrying out the encryption operation when the zero tag (tag-0) is indicated as the key pair tag. Another one is a tag value (tag-K) that is reserved for use when the kernel mode is selected as the operation mode of the processor. For the key pair corresponding to this tag value, the program key and the data key of a process to be executed in the kernel mode (which is the operating system in the ordinary computer system) are registered.

The effective key pair tag register 211 has a kernel mode key pair tag register 211-1 for storing the key pair tag in the kernel mode and a user mode key pair tag register 211-2 for storing the key pair tag in the user mode, either one of which will be selected according to the effective mode of the processor at a time to output the key pair tag (effective key pair tag) that is effective in the following processing.

FIG. 7 shows an exemplary detailed configuration of the instruction cache 301. The instruction cache 301 comprises arrays of a plurality of instruction cache lines 302. The cache line of the present invention carries out the search of an address in the cache, and each instruction cache line has a key pair tag region 302-1 for storing the key pair tag that indicates the protection attribute of the program data cached in that line, i.e., the program key to be applied to the cached program data, which is the characteristic feature of the present invention. The size of the key pair tag region 302-1 can be as many number of bits that can index all the entries of the key pair table to be described below. For example, in the case of using the key pair tag with 64 entries, the key pair tag region 302-1 with 6 bits size is sufficient. Note that each cache line is also provided with regions for indicating address that indicates the location of the program data in the external memory and its state.

FIG. 8 shows an exemplary detailed configuration of the data cache 401. The instruction cache 401 comprises arrays of a plurality of data cache lines 402. Each data cache line also has a key pair tag region 402-1 for storing the key pair tag that indicates the protection attribute of the processed data cached in that line, i.e., the data key to be applied to the cached processed data. Note that each cache line is also provided with regions for indicating address in the external memory and its state similarly as the instruction cache 301.

FIG. 9 shows an exemplary detailed configuration of the instruction decryption processing unit 501 and its operation. The instruction decryption processing unit 501 comprises a command data register 502 for temporarily storing the program data that is the decryption processing target and its encryption key, a decryption unit 503 for carrying out the decryption using the secret key, and a control unit 504 for controlling the command data register 502 and the decryption unit 503.

The instruction decryption processing unit 501 first receives a read request from the instruction cache 301. The parameters to be used at this point are the address in the external memory and the key pair tag for specifying the encryption key (program key) to be applied to the read out program data. Then, a read request is issued to the external memory by using the address as a parameter. Also, a program key read request is issued to the key pair management unit 701 by using the key pair tag as a parameter.

The encrypted program data from the external memory and the program key from the key pair management unit 701 that are sent in response to these read requests are stored into the command data register 502. The decryption unit 503 decrypts the encrypted program data by applying the program key to the encrypted program data on the command data register 502. When the decryption is completed, the plaintext data are outputted to the instruction cache 301.

FIG. 10 shows an exemplary detailed configuration of the data encryption/decryption processing unit 601 and its operation. The data encryption/decryption processing unit 601 comprises a command data register 602 for temporarily storing data in the plaintext form or the encrypted form that are processed by the program, an encryption/decryption unit 603 for carrying out the encryption/decryption using the secret key, and a control unit 604 for controlling the command data register 602 and the encryption/decryption unit 603.

The data encryption/decryption processing unit 601 first receives a read/write request from the data cache 401. The read request is issued after the interruption processing in the case of recovering the data that have been saved into the external memory temporarily at a time of the occurrence of the exception due to the interruption, for example. The write request is issued at a time of the occurrence of the interruption in the case of saving the data processed up to that point into the external memory by encrypting them in order to protect the data.

The parameters of the read request are the address in the external memory and the key pair tag for specifying the encryption key to be applied to the read out data.

First, a read request is issued to the external memory by using the address as a parameter. Also, a data key read request is issued to the key pair management unit 701 by using the key pair tag as a parameter. The processed data in the encrypted form from the external memory and the key data from the key pair management unit 701 that are sent in response to these read requests are stored into the command data register 602. The encryption/decryption unit 603 decrypts the encrypted data by applying the data key to the encrypted data on the command data register 602. When the decryption is completed, the plaintext data are outputted to the data cache 401.

On the other hand, the parameters of the write request are the address in the external memory to which the processed data should be written (i.e., to which the processed data should be temporarily saved), the data to be transferred, and the key pair tag for specifying the encryption key to be applied to the data.

First, a data key read request is issued to the key pair management unit 701 by using the key pair tag as a parameter. Then, the encryption/decryption unit 603 encrypts the plaintext data by applying by applying the data key to the plaintext data on the command data register 602. When the encryption is completed, the encrypted data are outputted to the external memory.

Figure 11:
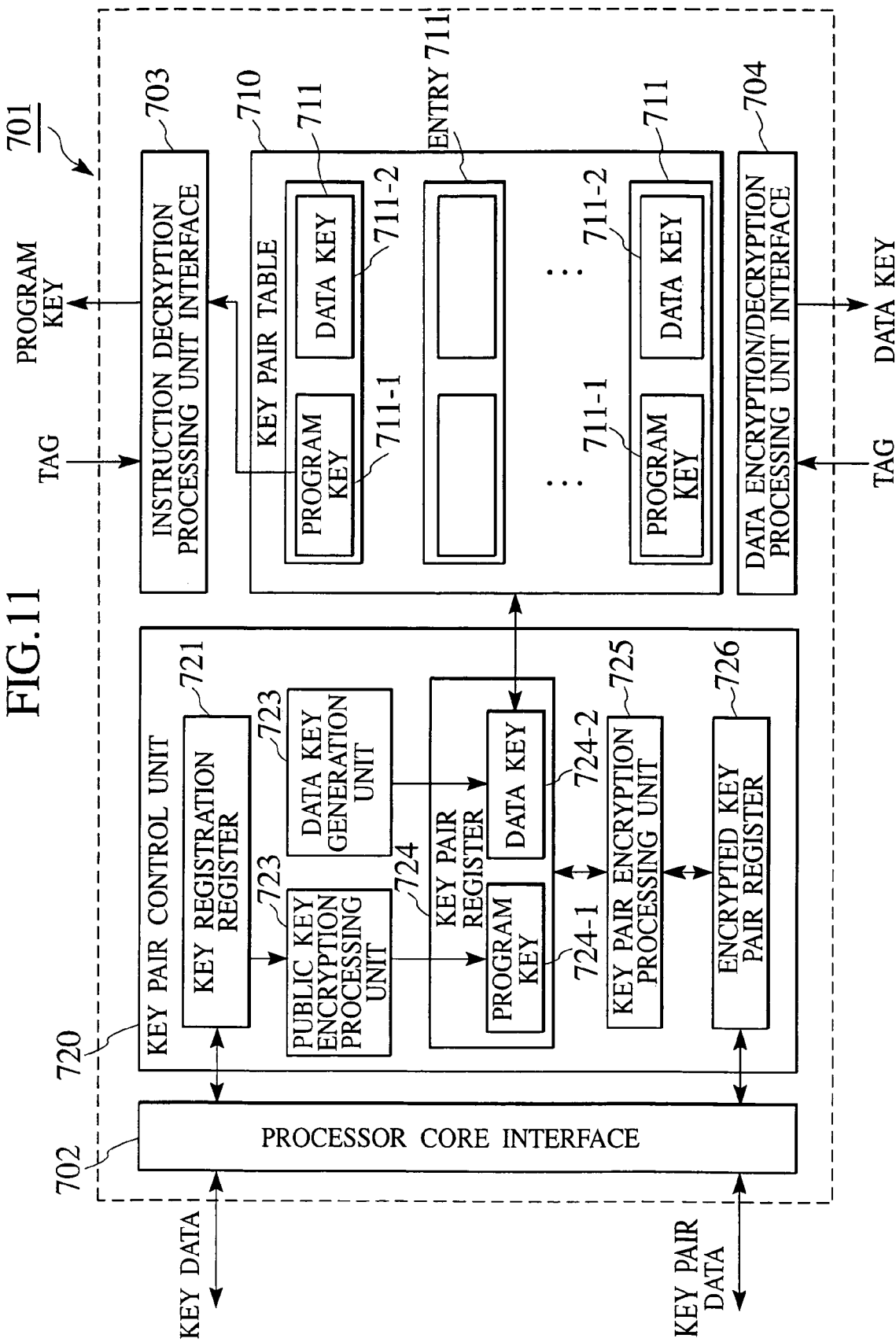
FIG. 11 is a block diagram showing an exemplary detailed configuration of a key pair management unit in the microprocessor of FIG. 1.

FIG. 11 shows an exemplary detailed configuration of the key pair management unit 701. The key pair management unit 701 comprises a processor core interface 702, an instruction decryption processing unit interface 703, a data encryption/decryption processing unit interface 704, the key pair table 710, and a key pair control unit 720.

The key pair table 710 has a plurality of key pair entries 711. Each key pair comprises a program key 711-1 and a data key 711-2. The key pair of the present invention is an index of the key pair table 710 formed by these key pair arrays. The operations of he key pair table 710 include the following three reading operations and one writing operation.

(1) Program Key Reading:

This is the operation to be carried out between the instruction decryption processing unit 501 and the key pair management unit 701. This is the reading operation through a port connected to the instruction decryption processing unit interface 703, in which the program key of the key pair specified by the key pair tag (i.e., index) in the register of the instruction decryption processing unit 501 is read out and outputted.

(2) Data Key Reading:

This is the operation to be carried out between the data encryption/decryption processing unit 601 and the key pair management unit 701. This is the reading operation through a port connected to the data encryption/decryption processing unit interface 704, in which the data key of the key pair specified by the key pair tag (i.e., index) in the register of the data encryption/decryption processing unit 601 is read out and outputted.

(3) Key Pair Reading:

This is the operation to be carried out between the processor core 201 and the key pair management unit 701. This is the reading operation through a port connected to the key pair control unit 720, in which both the program key and the data key of the key pair specified by the key pair tag are read out and outputted.

(4) Key Pair Writing:

This is the writing operation through a port connected to the key pair control unit 720, in which the program key and the data key given as parameters are stored as the key pair on the key pair table 710 specified by the index.

The key pair control unit 720 of the key pair management unit 701 carries out the following three operations according to requests from the processor core 201.

(1) New Key Pair Registration:

In the case of executing a new encrypted program, there is a need to newly register a pair of the program key for decrypting that encrypted program and the data key for encrypting/decrypting the data processed by that program. The key pair control unit 720 receives the program key data obtained by encrypting the program key by using the public key of the processor and the key pair tag to be used for this program key from the processor core 201. The program key data are stored into a key registration register 721, while the key pair tag is used as an index to the key pair table 710.

A public key encryption processing unit 722 decrypts the key data on the key registration register 721 by using the secret key of the processor, and stores the encrypted key data into a program key storage region 724-1 of a key pair register 724. Also, a data key generation unit 723 generates the data key by using arbitrary means such as a random number generation function, and stores the generated data key into a data key storage region 724-2 of the key pair register 724. When these two-keys are stored into the key pair register 724, the key pair control unit 720 registers a new key pair into the key pair table 710 according to the key pair writing operation of the key pair table 710.

(2) Existing Key Pair Reading:

The key pair control unit 720 receives a necessary key pair tag from the processor core 201. This key pair tag will be used as an index to the key pair table 710. The key pair table 710 reads out the key pair specified by the index by its reading operation, and stores the result into the key pair register 724 of the key pair control unit 720. A key pair encryption processing unit 725 encrypts the program key 724-1 and the data key 724-2 in the plaintext form stored in the key pair register 724 as a single data by using the secret key of the processor, and stores the result into an encrypted key pair register 726. The key pair control unit 720 outputs data on the encrypted key pair register 726 to the processor core 201.

(3) Existing Key Pair Writing:

The key pair control unit 720 receives the key pair tag and the key pair data in which the key pair is encrypted by the secret key of the processor from the processor core 201. The key pair data are stored into the encrypted key pair register 726, while the key pair tag is used as an index to the key pair table 710. The key pair encryption processing unit 725 decrypts data on the encrypted key pair register 726 by using the secret key of the processor. The resulting plaintext data are stored into the key pair register 724 as the program key and the data key. The key pair table 710 writes the key pair on the key pair register 724 by its writing operation.

Now, in the microprocessor of the present invention, a plurality of memories for storing data internally exist. In addition, there are also external memories to be accessed through the external bus interface 103. Among them, the memories provided inside the microprocessor which have regions for storing the key pair tag (such as the system register 210, the register file 230. etc.) will be referred to as "internal memories". Among the internal memories, those memories which are cache memories (such as the instruction cache 301, the data cache 401, etc.) will be referred to as "internal cache memories". On the other hand, memories provided outside the processor or memories which are provided inside the processor but which have no regions for storing the key pair tag will be referred to as "external memories".

In the following, details of the data transfers among these memories will be described, the data transfers among memories can be classified into four cases depending on whether the transfer source and the transfer destination are internal or external, including (i) from an internal memory to an internal memory, (ii) from an internal memory to an external memory, (iii) from an external memory to an internal memory, and (iv) from an external memory to an external memory.

Also, in this embodiment, the RISC type processor is presupposed so that the data transfers can also be classified according to the causes of the data transfers as follows. Here a way of specifying the key pair tag that the transfer destination should have at a time of the transfer is also indicated.

(1) Data Transfer Caused by the Instruction Fetch by the Instruction Fetch Decoder 220 of the Processor Core 201:

The key pair tag of the transfer destination in this case is the tag of the effective key pair of the currently executed program.

(2) Data Transfer Caused by the Execution of a Load Instruction or a Store Instruction at the Memory Access Unit 260 of the Processor Core 201:

The key pair tag of the transfer destination in this case is the tag of the effective key pair of the currently executed program. However, in the present invention, tag specifying load instruction and tag specifying store instruction that specify the key pair tag that the transfer destination should have as an operand of the instruction are added to the load instruction and the store instruction of MIPS. The instruction format and the way of specifying the operand for these instructions are arbitrary.

(3) Data Transfer Caused by the Execution of an Instruction at the Arithmetic Logical Operation Unit 250 of the Processor Core 201:

In the RISC type processor, only the register can be the data transfer destination of the operation instruction, so that the data transfer in this case can only be the data transfer between registers on the register file 230. The key pair tag of the transfer destination in this case is the tag of the currently effective key pair.

Next, a mechanism for protecting data to be concealed in this embodiment will be described. The data protection is realized at the tag judgement unit 252 of the arithmetic logical operation unit 250, the tag judgement unit 262 of the memory access unit 260, and the instruction execution control unit 223. In any of them, whether the data transfer is permitted or not is determined according to the common tag judgement rules. The criteria for the judgement include (1) an identifier for specifying the data transfer source, (2) a key pair tag attached to the data to be transferred (which will be referred to as "data tag"), and (3) a key pair tag that the transfer destination should have (which will be referred to as "transfer destination tag").

The minimum necessary rules for the tag judgement related to the data transfer are as listed below. It is also possible to add further rules in form of refusing the transfer according to the need. Also, the encryption processing can be applied in conjunction with the data transfer if necessary.

(1) The data transfer is permitted when it is the data transfer between internal memories where the transfer source is the internal cache, only if the data tag coincides with the transfer destination tag. Data will be transferred as they are, and the data tag will be added to the transfer destination.

(2) The data transfer is permitted unconditionally when it is the data transfer between internal memories where the transfer source is not the internal cache, and the data tag is set as the transfer destination tag.

(3) The data transfer is permitted unconditionally when it is the data transfer from an internal memory to an external memory. In this case, data are encrypted by using the encryption key (data key) of the key pair specified by the data tag. Namely, in the case of transferring data from the internal memory to the external memory, the data are encrypted by using the data key of the key pair specified by the data tag at the data encryption/decryption processing unit 601 first. The instruction fetch is used for the reading alone, and there is no operation for writing data to the external.

(4) The data transfer is permitted unconditionally when it is the data transfer from an external memory to an internal memory. In this case, data are decrypted by using the encryption key of the key pair specified by the transfer destination tag. Namely, in the case of transferring data from the external memory to the internal memory, if it is the data transfer caused by the instruction fetch, the data are decrypted by using the program key of the key pair specified by the transfer destination tag via the instruction decryption processing unit 501. If it is the data transfer caused by something other than the instruction fetch, the data are decrypted by using the data key of the key pair specified by the transfer destination tag via the data encryption/decryption processing unit 601.

(5) The processor of this embodiment will not be involved when it is the data transfer between external memories. Consequently, the data transfer between external memories will be carried out similarly as in the prior art.

Figure 12:
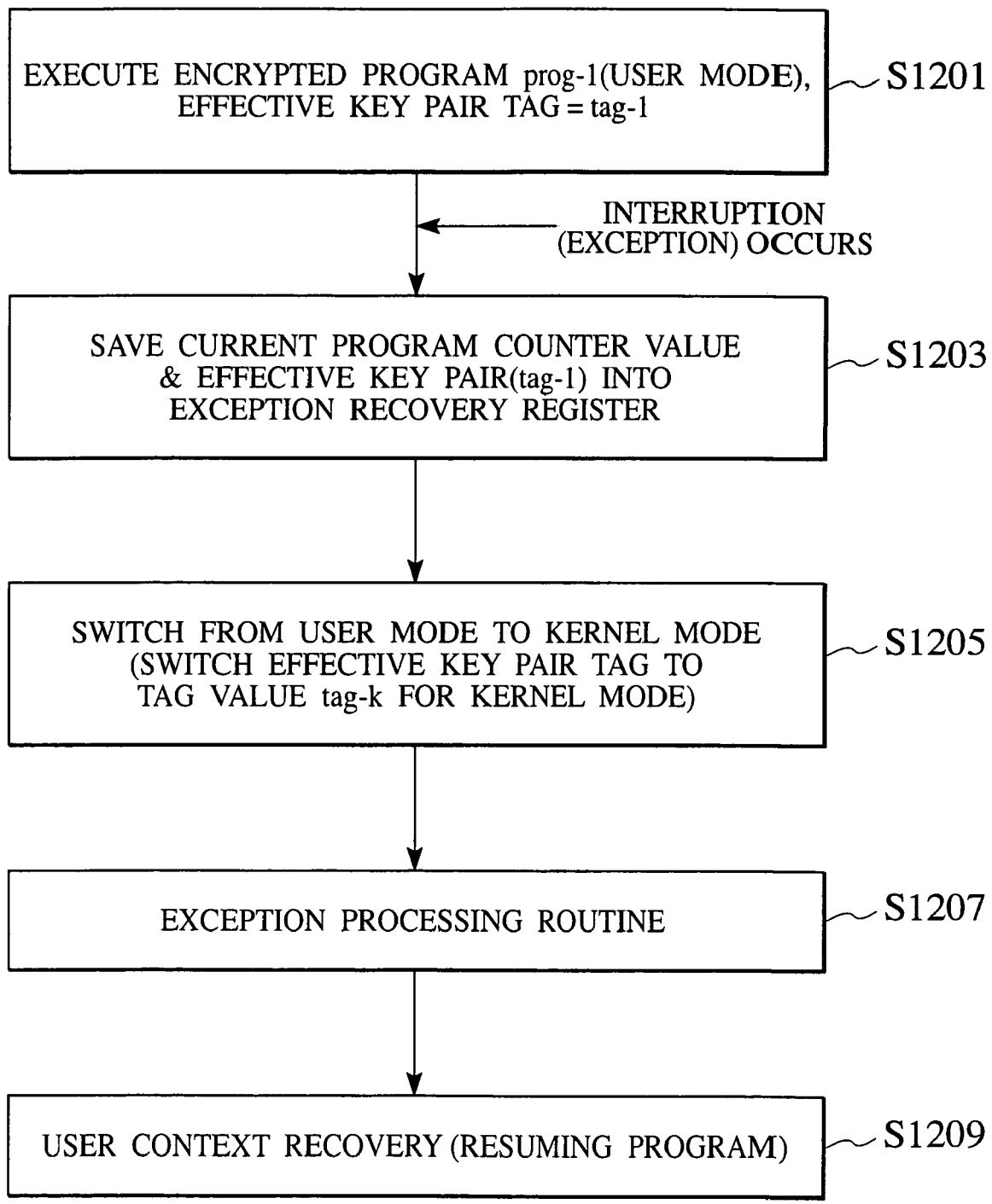
FIG. 12 is a flow chart showing a processing to be carried out by the microprocessor of FIG. 1 at a time of interruption occurrence.

Next, the context switching which is the basic processing of the operating system (OS) will be described with references to FIG. 12 to FIG. 14 for an exemplary case of processing using the above described protection function. As in the above, the exemplary case of using the R3000 type processor of the MIPS technologies, Inc. will be described below.

Here, it is assumed that the encrypted program "program-1" is executed in the user mode, at the step S1201. The program key "progkey-1" for decrypting that program and the data key "datakey-1" generated at a time of newly registering the program key are stored as the key pair in the key pair table 710. This key pair is identified by the key pair tag "tag-1".

Then, suppose that an exception occurs in the processor for reasons such as an interrupt from external source. In this case, the processor saves the current value of the program counter to the exception recovery register at the step S1203. At this point, the effective key pair tag is also saved in the exception recovery register. Then, the operation mode of the processor is switched from the user mode to the kernel mode at the step S1205. The tag value is switched from the tag value of the effective key pair to the tag value "tag-K" reserved for the kernel mode. By the switching of the operation mode and the tag value, the exception processing routine that is provided as a part of the OS is activated at the step S1207. When the exception processing routine is finished, the operation mode is switched to the user mode again so as to recover the context at the step S1209.

Figure 13:
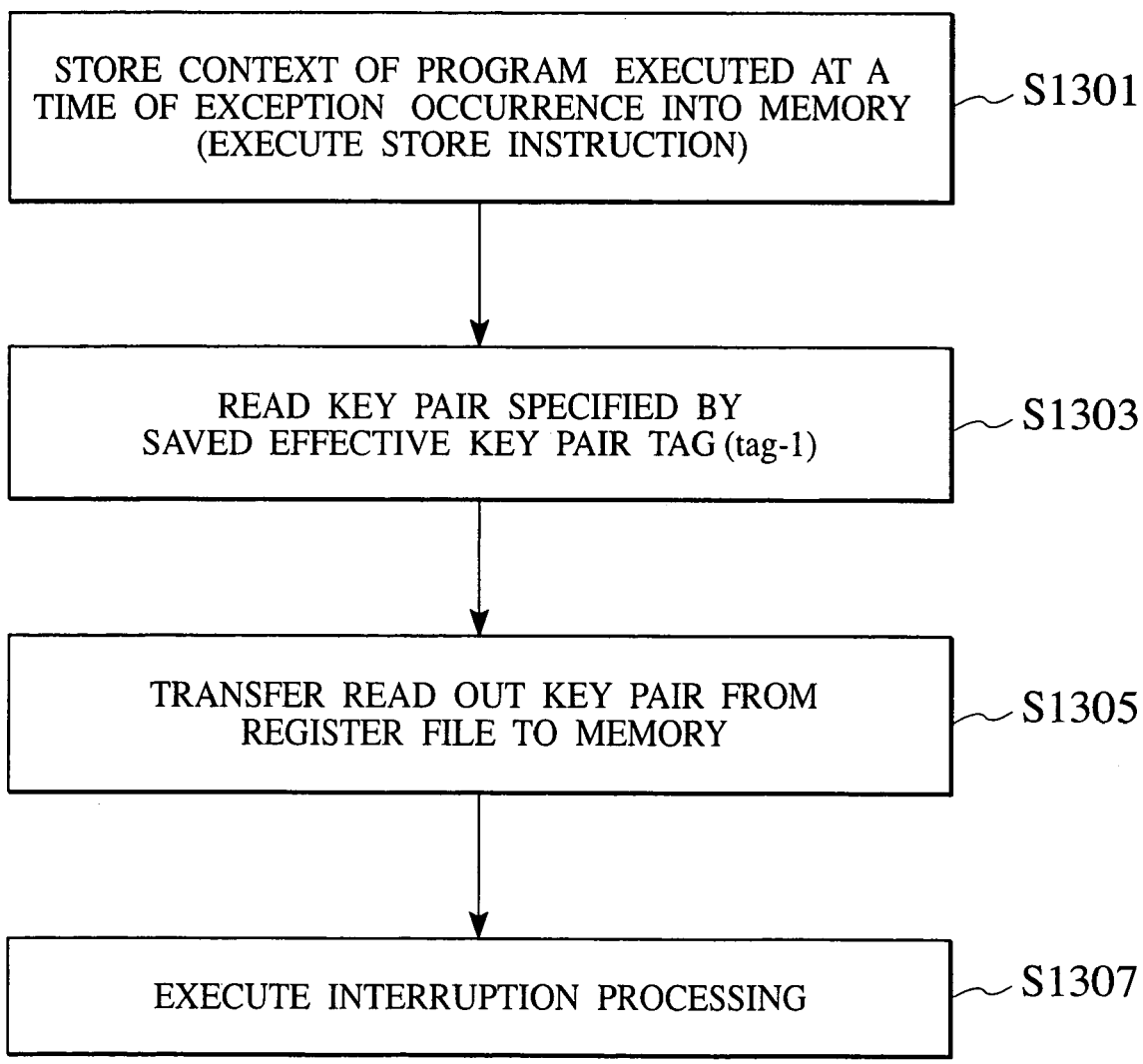
FIG. 13 is a flow chart showing details of an exception processing routine in the processing shown in FIG. 12.

FIG. 13 shows details of the exception processing routine of the step S1207. First, a store instruction for storing the context of the program that was executed when the exception occurred, i.e., the content of the register file 230, into the external memory is executed at the step S1.301. Also, the key pair specified by the saved effective key pair tag (tag-1) is read out from the key pair management unit 701 to the register file 230 (by the existing key pair reading operation) at the step S1303. Note that the key pair data read out to the register file 230 is attached with tag-K because it is data of the OS. The read out key pair data is then transferred from the register file 230 to the memory at the step S1305.

In this series of operations, if the OS carries out the arithmetic logical operation with respect to the data in the user mode (to which tag-1 is attached) improperly, this operation will not be permitted because of the operation limiting condition described above. On the other hand, the transfer of the data in the user mode to the external is the data transfer permitted by the data transfer limiting condition. At this point, the context of the user is saved outside of the register file 230, but whether it is saved at the data cache (internal memory) or it is saved at the external memory depends on the state of the data cache. Note however that the saving of the context from the register file 230 is already completed from a viewpoint of the operation of the OS. Then, the interruption processing is executed at the step S1307.

FIG. 14 shows the user context recovery processing (that is, the resuming of the program) after the exception processing routine is completed. First, the key pair saved in the memory is loaded from the memory as data of the OS at the step S1401. Then, this key pair is stored as the key pair corresponding to tag-1 in the key pair table 710 (by the existing key pair writing operation) at the step S1403. Next, the context saved in the memory is recovered to the register file 230 at the step S1405. At this point, the transfer destination tag attached load instruction is executed, and tag-1 is specified as the transfer destination tag. Also, the program counter value to be recovered and the effective key pair tag (tag-1) are stored into the exception recovery register at the step S1407. Finally, the transition to the user mode is made by using the exception recovery instruction (ERET instruction in the MIPS-IV) at the step S1409, and this completes the context recovery. The data transfer in this series of operations is also the data transfer permitted by the data transfer limiting condition described above.

The fact that data attached with tag-1 are protected at times of the context saving and recovery can be confirmed as follows. First, during the execution using the key pair tag other than tag-1 as the effective key pair tag, data with tag-1 cannot be a target of the operation according to the data transfer limiting condition. On the other hand, during the execution of the program decrypted by using the program key specified by tag-1, the value of the effective key pair tag is tag-1 so that the OS cannot ascertain the processing inside the microprocessor. When the executed data are transferred to the external memory by the interruption or the like, the data are encrypted by using the data key of the key pair specified by tag-1, and this data key cannot possibly be ascertained without knowing the secret key of the microprocessor. Also, at a time of the context recovery, data are recovered by the tag attached load instruction, and this tag is different from the effective key pair tag of the OS so that an access from the OS will not be permitted. Conversely, even if the effective key of the OS itself is secretly changed to tag-1 which is the key pair tag of the recovered user context, the own instruction sequence would be decrypted by using the program key that is unknown to the OS, so that the OS would have to execute the unexpected instructions.

In this way, by handling the program key and the data key as inseparable key pair, it becomes possible to conceal the secret data even from the program executed in the privileged mode.

Referring now to FIG. 15, the second embodiment of a microprocessor according to the present invention will be described in detail.

FIG. 15 shows a configuration of a key pair table 810 to be used in the microprocessor according to the second embodiment of the present invention. The first embodiment described above uses a method for handling one program key and one data key in one-to-one correspondence relationship, whereas the second embodiment uses a method for handling one program key and a plurality of data key in correspondence.

Under the multi-task environment, there can be cases where different types of data processings are to be carried out for the same one program. In such cases, there is only one decryption key of the program (program key) but there are separate data keys for encrypting/decrypting the processed data. If each one of these separate data keys is paired with the program and stored separately, a huge memory capacity would be required.

For this reason, in the second embodiment, the index of the program key and the index of the data key are stored in pair while the program key and the data key are stored separately.

FIG. 15 shows an exemplary configuration of the key pair table 810 of the second embodiment, which comprises a key table 820 for storing the keys themselves, and a key pair look up table 830 formed by indexes for indirectly looking up the keys.

The key table 820 is formed by arrays of entries in which the program key and the data keys are entered separately. On the other hand, the key pair look up table 830 indicates the key pairs, but instead of directly storing the key pairs, it is formed by the index 831-1 of the program key and the index of the data key 831-2. Using these indexes, it becomes possible to specify a particular program and a plurality of data to be processed by this program. For example, in the example of FIG. 15, these indexes can be used to combine data to be encrypted/decrypted by using the data key #4 and data to be encrypted/decrypted by using the data key #5 with the same program to be decrypted by using the program key #3.

The operations of the key table 820 include the following reading operation and writing operation.

(1) Key Reading:

The common key of the key entry specified by the index given as a parameter is read out from the key table 820.

(2) Key Writing:

First, one unused key entry is allocated. Then, the common key (the program key or the data key) given as a parameter is stored into that key entry, and an index for specifying the allocated key entry is outputted.

The operations of the key pair table 810 are basically the same as those of the key pair table 710 of the first embodiment. However, as the key pair table 810 is divided into the key table 820 and the key pair look up table 830, details of the key reading and writing become as follows.

(1) Program Key Reading:

This is the reading operation through a port connected to the instruction decryption processing unit interface 703, in which the key reading operation with respect to the key table 820 is carried out by using the index of the program key among the keys specified by the index pair in the key pair look up table 830, and its result is outputted.

(2) Data Key Reading:

This is the reading operation through a port connected to the data encryption/decryption processing unit interface 704, in which the key reading operation with respect to the key table 820 is carried out by using the index of the data key among the keys specified by the index pair in the key pair look up table 830, and its result is outputted.

(3) Key Pair Reading:

This is the reading operation through a port connected to the key pair control unit 720, in which both the program key and the data key of the key pair specified by the index pair in the key pair look up table 830 are read out from the key table 820 by using the respective indexes, and the obtained two keys are outputted.

(4) Key Pair Writing:

This is the writing operation through a port connected to the key pair control unit 720, in which the program key and the data key given as parameters are separately stored into the key table 820 by the key writing operation of the key table 820. The indexes of the key entries obtained as a result are stored into the program key index and the data key index in the key pair look up table 830.

The key pair table 810 has interfaces for providing the same operation from a viewpoint of the key pair control unit 720. Consequently, three operations of the key pair control unit 720 including the new key pair registration, the existing key pair reading, and the existing key pair writing are the same as in the first embodiment.

However, in the second embodiment, the following operations are added to the key pair table 810 and the key pair control unit 720 besides the operations of the first embodiment, in order to provide a mechanism by which one process uses a plurality of data keys.

First, the operation to be added to the key pair table 810 is as follows.

Data Key Writing:

This is the writing operation through a port connected to the key pair control unit 720, in which the program key index, the data key, and the key pair tag are received as parameters. First, the data key is stored into the key table 820 by the key writing operation of the key table 820. The index of the key entry obtained as a result and the program key index received as a parameter are respectively stored into the data key index 831-2 and the program key index 831-1 of the key pair specified by the key pair tag as the index.

Next, the operation to be added to the key pair control unit 720 is as follows.

New Data Key Registration:

Here, a first key pair tag for specifying the process that owns the data key, a second key pair tag for specifying the data key to be newly registered, and the key data in which the data key to be registered is encrypted by using the program key of the first key pair tag are received from the processor core 201. The key data are stored into the encrypted key pair register 726 even though it is not the key pair data.

First, the key pair reading operation with respect to the key table 820 is carried out by using the first key pair tag as the index, and the key pair is read out to the key pair register 724.

The key pair encryption processing unit 725 decrypts data on the encrypted key pair register 726 by using the program key 724-1 on the key pair register 724 by regarding this data as the encrypted key, and stores its result to the data key 724-2 of the key pair register 724.

The key pair control unit 720 registers the index of the program key read out by using the first key pair tag and the data key 724-2 of the key pair register 724 as the key pair by using the data key writing operation of the key pair table 810.

By this operation, a new key index pair in which the index of the registered data key and the index of the program key to be used with that data key are paired can be formed.

In other words, this is the operation for grouping a plurality of key pairs that share the common program key. Moreover, the encryption processing using the program key is required in the operation for adding the key pair to the group, so that it is only possible for those processes which know the program key.

The above described data key registration operation gives the data encrypted by using the program key, but it is also possible to modify this operation such that it gives the data encrypted by using another key different from the program key, such as the public key of the processor or another data key. In this case, it is the operation for grouping according to another key rather than grouping according to the program key, so that it is applicable to the situation where the key is to be shared among programs.

In the first embodiment, a limiting mechanism in which the coincidence of the key pair tag values is set as a condition for the success of the data transfer and the operational manipulation has been described. In the second embodiment, the data transfer and the operational manipulation are to be permitted for the key pairs generated by the same process even if the key pair tags are different. Namely, in addition to the key pair tag value itself used in the first embodiment, the program key index and the data key index of the key pair specified by that key pair tag are also used as the criteria for judging whether the data transfer or the operational manipulation is permitted or not.

As for the context switching by the operating system, the exemplary case described above for the first embodiment is also applicable to the second embodiment.

Note that the first and second embodiments have been described above by using configurations formed by functional elements, but these functions only represent the logical division and do not indicate the physical arrangement of the functional elements on the processor. For example, the key pair is stored as one set in one table in the above embodiments, but the physical arrangement on the processor can be such that a table storing the program keys is to be provided in a vicinity of the instruction decryption processing unit while a table storing the data keys is to be provided in a vicinity of the data encryption/decryption processing unit, for example.

As described above, according to the present invention, the program key for decrypting the program and the data key for encrypting/decrypting the data are handled as cryptographically inseparable pair inside the processor, so that it becomes possible for the processor to protect processes that actually execute the program, without intervention by the operating system. Consequently, it becomes possible to conceal the secret information of the program not only from other user programs but also from the operating system.

Also, according to the present invention, a tag for identifying the process that is a target of the protection by the processor is attached to data inside the processor so that it becomes possible to carry out the switching of processes while maintaining the protection target data in the decrypted form within the internal memory.

Namely, assuming the program encryption key distribution scheme using the public key cryptosystem, the present invention basically proposes a key management scheme in which the program key (first key) for decrypting the encrypted program and the data key (second key) for encrypting/decrypting data processed by this program which is generated by the microprocessor are maintained in correspondence as the key pair.

According to this scheme, the microprocessor decrypts the encrypted program by using the first key, generates the second key corresponding to the first key, and gives an identifier to a combination of these keys. The first key and the second key are written into the key pair table as the key pair, and the identifier is used by the subsequent processing for the purpose of identifying this key pair. During the execution of the decrypted program, the identifier given to the key pair of the first key used in decrypting this program is indicated. When the execution of the decrypted program is to be discontinued by the interruption or the like, the data processed by this program is encrypted by using the second key corresponding to the current identifier, and saved to the external memory or the like. The access right with respect to the processed data is judged according to the coincidence of the key pair such that the protection of data among processes is guaranteed cryptographically.

In order to realize this scheme, the microprocessor of the present invention has an instruction decryption processing unit for decrypting the encrypted program by using the first encryption key (program key), a data encryption/decryption processing unit for encrypting/decrypting the data processed by the decrypted program (i.e., the execution state of the process) by using the second encryption key (data key), a key pair management unit having a first memory region (key pair table) for storing the first and second keys in pair, and a second memory region (register file) for storing a tag (identifier) for identifying this key pair along with data related to the program.

The program key and the data key are stored as inseparable pair, and in the case of operating this pair from the program side, this key pair can be operated only in an encrypted form obtained by using the secret key specific to the processor. In this way, it becomes possible to make the analysis of the program itself cryptographically difficult and also make the analysis of the execution state of the program difficult even from the operating system, at a time of executing the encrypted program. Also, by attaching a tag for identifying the key pair to each corresponding data, the data transfer using the encryption processing can be carried out within a range that is minimum necessary for maintaining the secret.

The program key for decrypting the encrypted program is given by the public key cryptosystem. The microprocessor also has a data key generation unit, and generates the data key for encrypting/decrypting data to be processed by the program decrypted by this program key when the new program key is given. The key pair generated in this way is stored in the key pair table.

The microprocessor has a third memory region (system register) for storing the effective key pair identifier which is an identifier of the effective key pair that is used by the currently executed program. When a transition to the kernel mode is made due to the interruption or the like while the program is executed in the user mode, the effective key pair identifier is switched to a specific value indicating the kernel mode. In this way, the program of the user mode and the interruption processing program can be distinguished clearly.

When the interruption processing program temporarily saves the data stored in the second memory region by the program of the user mode to the external, the data encryption/decryption processing unit transfers the data to the external memory by using the encryption key specified by the identifier attached to that data. In this way, the data can be protected safely even when the exception due to the interruption or the like occurs.

The key pair table stores a plurality of key pairs, where each key pair is formed by paring the first key (program key) and the second key (data key) in one-to-one correspondence.

Alternatively, the key pair table may contain a look up storage region for storing an index of the first key and an index of the second key in correspondence, and a key storage region for storing the first and second keys separately. In this case, the key index itself has a small size so that only a small memory capacity is required for the look up storage region. Also, the separately stored first and second keys are specified by the indexes, so that the indexes can be used to specify a plurality of key pairs by appropriately combining the program key and the data keys of the processed data, in the case where a plurality of different data are processed with respect to the same one program under the multi-task environment, for example.

The microprocessor also has a memory access unit connected to the second memory region and the third memory region. The memory access unit has a data transfer judgement unit for judging whether the data transfer is permitted or not according to an identifier of the key pair attached to the data to be transferred and the effective key pair identifier.

The microprocessor also has a logical operation unit connected to the second memory region and the third memory region. The logical operation unit has an operation execution judgement unit for judging whether the operation execution is permitted or not according to an identifier attached to the operand of the operation and the effective key pair identifier.

In this way, the safety of the data can be further improved by attaching the identifier for identifying the key pair to the data to be handled inside the microprocessor, and using the identifier of the key pair attached to the data for judging the access right or the operation execution possibility at a time of the data transfer or the operational manipulation.

The second memory region is formed by a plurality of entries, and each entry has data related to the program and an identifier for identifying the key pair to be used for that data. With this configuration, when the processing in the kernel mode is requested due to the interruption and the effective key pair identifier in the third memory region takes a value indicating the kernel mode, for example, it becomes possible to encrypt only the data of the desired entry and the corresponding identifier and save them to the external memory. Namely, at a time of the interruption occurrence, in addition to the saving of the entire data in the second memory region, it is possible to save only a part of the data in the second memory region.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A microprocessor, comprising:
   a memory having a key pair table for storing a first encryption key and a second encryption key in correspondence as a pair key with a corresponding identifier;

a decryption unit configured to decrypt an encrypted program by using the first encryption key to obtain a non-encrypted program;

a first register storing data processed during execution of the non-encrypted program, along with the identifier corresponding to the first encryption key; and an encryption unit configured to encrypt the data by using the second encryption key corresponding to the identifier; and a second register storing an effective key pair identifier corresponding to an effective key pair used for a currently executed program, wherein the encryption unit encrypts and transfers the data to an external memory when the effective key pair identifier stored in the second register changes.

2. The microprocessor of claim 1, wherein the effective identifier changes to a specific value when a mode of the microprocessor changes from a user mode to a kernel mode.

3. The microprocessor of claim 1, further comprising:

a decryption unit configured to decrypt the data by using the second encryption key, wherein when the effective key pair identifier stored in the second register changes back to a value corresponding to the effective key pair used for a previously executed program, the decryption unit reads out the encrypted data corresponding to the previously executed program and stored in the external memory and decrypts the encrypted data by using the second encryption key of the key pair corresponding to the effective key pair identifier.

4. The microprocessor of claim 1, wherein the first register is formed by a plurality of entries and each entry stores the data and the corresponding identifier, and the encryption unit encrypts and transfers data in a desired entry to an external memory when the effective key pair identifier stored in the second register changes.

5. The microprocessor of claim 1, wherein the first encryption key is given by a public key cryptosystem, and the microprocessor further comprises a key generation unit configured to generate the second encryption key for encrypting the data processed during the execution of the program that is decrypted by using the first encryption key when the first encryption key is given.

6. The microprocessor of claim 5, wherein the key pair table stores the key pair of the first encryption key and the second encryption key in an encrypted form obtained by using a secret key of the microprocessor.

7. The microprocessor of claim 1, wherein the key pair table includes a key pair look up storage region for storing an index of the first encryption key and an index of the second encryption key as a pair, and a key storage region for storing the first encryption key and the second encryption key separately.

8. A data protection method for a microprocessor, the method comprising:

storing a first encryption key and a second encryption key in correspondence as a pair key with a corresponding identifier into a key pair table in an internal memory;

decrypting an encrypted program by using the first encryption key to obtain a non-encrypted program;

executing in the microprocessor the non-encrypted program;

storing data processed during execution of the non-encrypted program, along with the identifier corresponding to the first encryption key into a first register; and encrypting the data by using the second encryption key corresponding to the identifier; and storing an effective key pair identifier corresponding to an effective key pair used for a currently executed program into a second register, wherein the data is encrypted and transferred to an external memory when the effective key pair identifier stored in the second register changes.

9. The data protection method of claim 8, wherein the effective identifier changes to a specific value when a mode of the microprocessor changes from a user mode to a kernel mode.

10. The data protection method of claim 8, further comprising:

when the effective key pair identifier stored in the second register changes back to a value corresponding to the effective key pair used for a previously executed program, reading out the encrypted data corresponding to the previously executed program and stored in the external memory and decrypting the encrypted data by using the second encryption key of the key pair corresponding to the effective key pair identifier.

11. The data protection method of claim 8, wherein the first register is formed by a plurality of entries and each entry stores the data and the corresponding identifier, and data in a desired entry is encrypted and transferred to an external memory when the effective key pair identifier stored in the second register changes.

12. The data protection method of claim 8, wherein the first encryption key is given by a public key cryptosystem, and the method further comprises generating the second encryption key for encrypting the data processed during the execution of the program that is decrypted by using the first encryption key when the first encryption key is given.

13. The data protection method of claim 12, wherein the key pair table stores the key pair of the first encryption key and the second encryption key in an encrypted form obtained by using a secret key of the microprocessor.

14. The data protection method of claim 8, wherein the key pair table includes a key pair look up storage region for storing an index of the first encryption key and an index of the second encryption key as a pair, and a key storage region for storing the first encryption key and the second encryption key separately.

* * * * *